(12) United States Patent
Chen

(10) Patent No.: US 11,222,104 B2
(45) Date of Patent: Jan. 11, 2022

(54) VERIFICATION METHOD, MOBILE TERMINAL, DEVICE, AND SYSTEM

(71) Applicant: Huawei Technologies Co., Ltd., Shenzhen (CN)

(72) Inventor: Zhongxian Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 157 days.

(21) Appl. No.: 16/479,807

(22) PCT Filed: Mar. 20, 2017

(86) PCT No.: PCT/CN2017/077373
§ 371 (c)(1),
(2) Date: Jul. 22, 2019

(87) PCT Pub. No.: WO2018/133190
PCT Pub. Date: Jul. 26, 2018

(65) Prior Publication Data
US 2020/0074064 A1    Mar. 5, 2020

(30) Foreign Application Priority Data

Jan. 22, 2017    (CN) .......................... 201710054321.3

(51) Int. Cl.
*G06F 7/04*        (2006.01)
*G06F 15/16*       (2006.01)
(Continued)

(52) U.S. Cl.
CPC .............. *G06F 21/34* (2013.01); *G06F 21/44* (2013.01); *G06F 21/74* (2013.01); *G06F 2221/2129* (2013.01)

(58) Field of Classification Search
CPC .......... G06F 21/34; G06F 21/44; G06F 21/74; G06F 2221/2129; G06F 21/31
See application file for complete search history.

(56) References Cited

U.S. PATENT DOCUMENTS

2005/0003799 A1    1/2005  Kang
2005/0177867 A1    8/2005  Toutonghi
(Continued)

FOREIGN PATENT DOCUMENTS

CN    1578520 A    2/2005
CN    1801708 A    7/2006
(Continued)

OTHER PUBLICATIONS

Machine Translation and Abstract of Chinese Publication No. CN105426716, dated Mar. 23, 2016, 30 pages.
(Continued)

*Primary Examiner* — Amie C. Lin
(74) *Attorney, Agent, or Firm* — Conley Rose, P.C.

(57) ABSTRACT

A device and a mobile terminal detect that a local end is connected to a peer end by using a data cable. If the mobile terminal detects a first operation action that is performed by a user on a touch display screen of the mobile terminal, the device gains access to the mobile terminal. The device displays a first screen if the mobile terminal detects a second operation action that is performed by the user on an input apparatus different from the touch display screen of the mobile terminal. The first screen is used to prompt the user to enter a screen unlock password of the mobile terminal on the device.

16 Claims, 24 Drawing Sheets

(51) Int. Cl.
*G06F 17/30* (2006.01)
*H04L 29/06* (2006.01)
*G06F 21/34* (2013.01)
*G06F 21/44* (2013.01)
*G06F 21/74* (2013.01)

(56) References Cited

U.S. PATENT DOCUMENTS

| | | | |
|---|---|---|---|
| 2006/0156028 A1 | 7/2006 | Aoyama et al. | |
| 2008/0115208 A1 | 5/2008 | Lee | |
| 2015/0153887 A1* | 6/2015 | Kim | G06F 3/0446 345/173 |
| 2015/0207949 A1 | 7/2015 | Takeo | |
| 2015/0288701 A1 | 10/2015 | Brand | |
| 2016/0313795 A1 | 10/2016 | Muramatsu | |
| 2016/0342784 A1 | 11/2016 | Beveridge et al. | |
| 2018/0049029 A1* | 2/2018 | Kumar | G06F 21/35 |

FOREIGN PATENT DOCUMENTS

| | | | |
|---|---|---|---|
| CN | 101169812 A | | 4/2008 |
| CN | 103067282 A | | 4/2013 |
| CN | 103699454 A | | 4/2014 |
| CN | 103838648 A | | 6/2014 |
| CN | 104467923 A | | 3/2015 |
| CN | 104735168 A | | 6/2015 |
| CN | 105094532 A | | 11/2015 |
| CN | 105117313 A | | 12/2015 |
| CN | 105426716 A | | 3/2016 |
| CN | 105426742 A | | 3/2016 |
| CN | 105468988 A | | 4/2016 |
| CN | 105589761 A | | 5/2016 |
| CN | 105991631 A | | 10/2016 |
| CN | 106203035 A | * | 12/2016 |
| CN | 106203035 A | | 12/2016 |
| CN | 106327193 A | | 1/2017 |
| CN | 106339617 A | | 1/2017 |

OTHER PUBLICATIONS

Machine Translation and Abstract of Chinese Publication No. CN105426742, dated Mar. 23, 2016, 12 pages.
Machine Translation and Abstract of Chinese Publication No. CN106203035, dated Dec. 7, 2016, 23 pages.
"2.3 gingerbread-Broken screen while debug mode was disabled. How can I re-enable adb?," XP055270568, dated Nov. 20, 2013, 3 pages.
Foreign Communication From A Counterpart Application, European Application No. 17892418.9, Extended European Search Report dated Oct. 16, 2019, 10 pages.
Foreign Communication From A Counterpart Application, PCT Application No. PCT/CN2017/077373, English Translation of International Search Report dated Jun. 28, 2017, 2 pages.
Foreign Communication From A Counterpart Application, PCT Application No. PCT/CN2017/077373, English Translation of Written Opinion dated Jun. 28, 2017, 4 pages.

* cited by examiner

VERIFICATION METHOD, MOBILE TERMINAL, DEVICE, AND SYSTEM

CROSS-REFERENCE TO RELATED APPLICATIONS

This application is a National Stage of International Application No. PCT/CN2017/077373, filed on Mar. 20, 2017, which claims priority to Chinese Patent Application No. 201710054321.3, filed on Jan. 22, 2017. Both of the aforementioned applications are hereby incorporated by reference in their entireties.

TECHNICAL FIELD

The present invention relates to the field of electronic technologies, and in particular, to a verification method, a mobile terminal, a device, and a system.

BACKGROUND

Mobile devices are increasingly popular now. A mobile phone, as a mainstream mobile terminal, not only functions as a single communications device, but also integrates functions in various fields of human life such as communication, entertainment, shopping, camera, and office work. Rich functions bring abundant personal data stored in the mobile phone.

To adapt to portability, overall dimensions of the mobile phone are usually far smaller than dimensions of other devices such as a portable computer, and this makes a display screen of the mobile phone relatively small, and relatively limits controllability and a storage capacity of an input device. Further, data in the mobile phone needs to be transferred during replacement. Therefore, the data is usually uploaded to a cloud through cloud backup, or the mobile phone is connected to a computer by using a data cable, and the computer accesses the data in the mobile phone, to obtain the stored data (such as an SMS message, a call record, and a picture) from the mobile phone.

Because a display screen of a current mobile device is made of glass, the display screen is extremely vulnerable to damage if the device is dropped, extruded, or bumped. Because a mainstream mobile device in the market needs to be operated by touching a virtual button on a screen, and the mobile phone cannot be operated once the screen is damaged. However, screen maintenance is high in costs and troublesome, and the screen needs to be replaced at a maintenance site. In addition, current mobile devices update relatively fast, and are low in prices. When a screen is damaged, most users prefer to use a new mobile phone. However, when the screen of the mobile device is broken, the user cannot operate the mobile phone to upload data to the cloud. To export the data from the mobile phone, the user needs to visit the maintenance site to replace a display screen group. The user can operate the mobile phone to migrate the data only after the display screen group is repaired, otherwise, the personal data cannot be extracted.

As limited by a mainstream mobile operating system, when the mobile phone is connected to a PC (Personal Computer) by using a USB (universal serial bus, Universal Serial Bus), a connection can be established only after a related USB mode option is selected on the screen of the mobile phone. For example, when a USB data cable is plugged in for connection, the user also needs to confirm access permission and the like on the touch display screen of the mobile phone. In this case, the data still cannot be migrated, and this brings inconvenience to the user.

SUMMARY

Some embodiments of the present invention provide a verification method for data-cable-based connection, a mobile terminal, a device, and a system, to eliminate a defect and a problem of inconvenience generated when a user uses a mobile terminal for interaction in the prior art.

According to an aspect, some embodiments of the present invention provide a verification method, where the verification method includes: first, detecting, by a device and a mobile terminal, that the device and the mobile terminal are already connected to each other by using a data cable; and if the mobile terminal detects a first operation action that is performed by a user on a touch display screen of the mobile terminal, gaining, by the device, access to the mobile terminal; or displaying, by the device, a first screen if the mobile terminal detects a second operation action that is performed by the user on a physical button of the mobile terminal, to prompt the user to enter a screen unlock password of the mobile terminal on the device, then, verifying, by the device or the mobile apparatus, the screen unlock password of the mobile apparatus that is entered by the user on the device, and after verification is successful, gaining, by the device, access to the mobile terminal.

With reference to the method in a first embodiment of the first aspect of the present invention, in a second embodiment, the step of displaying the first screen if the mobile terminal detects a second operation action that is performed by the user on a physical button of the mobile terminal includes: displaying, by the device, the first screen after detecting a third operation action that is performed by the user on the device.

With reference to the method in the second embodiment of the first aspect of the present invention, in a third embodiment, the step of the displaying, by the device, the first screen after detecting a third operation action that is performed by the user on the device includes: after detecting the third operation action that is performed by the user on the device, obtaining, by the device, screen password information of the mobile terminal from the mobile terminal; and generating, by the device, the first screen based on screen unlock password information of the mobile terminal, and displaying the first screen.

With reference to the method in any one of the first embodiment to the third embodiment of the first aspect of the present invention, in a fourth embodiment, the screen unlock password includes at least any one of the following: a character string password, a pattern password, a fingerprint password, a voice password, or an iris password.

A second aspect of the present invention provides a method for implementing access verification on a device by a mobile terminal on a device side, including: detecting, by the device that the device is already connected to a mobile terminal by using a data cable; and if the mobile terminal detects a first operation action that is performed by a user on a first input apparatus of the mobile terminal; or displaying a first screen if the mobile terminal detects a second operation action that is performed by the user on a second input apparatus of the mobile terminal, where the first screen is used to prompt the user to enter a screen unlock password of the mobile terminal on the device, then, obtaining and verifying, by the device, the screen unlock password of the mobile terminal that is entered by the user on the device, or sending, to the mobile terminal for verification, the obtained screen unlock password of the mobile terminal that is entered by the user on the device, and after verification is successful, gaining, by the device, access to the mobile terminal.

With reference to the method in the first embodiment of the second aspect of the present invention, in a second embodiment, the step of displaying, by the device, a first screen if the mobile terminal detects a second operation action that is performed by the user on a second input apparatus of the mobile terminal includes: displaying, by the device, the first screen after detecting a third operation action that is performed by the user on the device.

With reference to the method in the second embodiment of the second aspect of the present invention, in a third embodiment, the step of generating and displaying, by the device, the first screen specifically includes: obtaining, by the device, screen unlock password information of the mobile terminal from the mobile terminal; and then, generating, by the device, the first screen based on the screen unlock password information of the mobile terminal, and displaying the first screen on a display apparatus of the device.

With reference to the method in any one of the first embodiment to the third embodiment of the second aspect of the present invention, in a fourth embodiment, the device sends, to the mobile terminal for verification, the screen unlock password of the mobile terminal that is entered by the user on the device; and obtains a verification result from the mobile terminal.

With reference to the method in any one of the first embodiment to the fourth embodiment of the second aspect of the present invention, in a fifth embodiment, the first input apparatus is a touch display screen, and the input apparatus is an input apparatus different from the touch display screen.

A third aspect of the present invention provides a method for implementing access verification on a device by a mobile terminal on a mobile terminal side, including: detecting, by the mobile terminal, that the mobile terminal is already connected to the device by using a data cable; and allowing access of the device if the mobile terminal detects a first operation action that is performed by a user on a first input apparatus of the mobile terminal; or if the mobile terminal detects a second operation action that is performed by the user on a second input apparatus of the mobile terminal, sending screen unlock password information of the mobile terminal to the device, to display, on the device, a first screen that is used to prompt the user to enter a screen unlock password of the mobile terminal on the device, obtaining and verifying the screen unlock password of the mobile terminal that is entered by the user on the device, or obtaining a verification result of the device for the screen unlock password of the mobile terminal that is entered by the user on the device, and allowing access of the device after verification is successful.

With reference to the method in the first embodiment of the third aspect of the present invention, in a second embodiment, the mobile terminal switches from a first mode to a second mode in response to the detected first operation action that is performed by the user on the first input apparatus of the mobile terminal, so as to allow access of the device.

With reference to the method in the first embodiment or the second embodiment of the third aspect of the present invention, in a third embodiment, the step of sending screen unlock password information of the mobile terminal to the device includes: receiving a request message that is sent by the device based on a detected third operation action that is performed by the user on the device; and sending the screen unlock password information of the mobile terminal to the device according to the request message.

With reference to the method in the third embodiment of the third aspect of the present invention, in a fourth embodiment, the step of sending, by the mobile terminal, the screen unlock password information of the mobile terminal to the device includes: switching, by the mobile terminal, from the first mode to a third mode in response to the detected second operation action that is performed by the user on the second input apparatus of the mobile terminal; and then receiving, in the third mode, a command that is sent by the device in response to the detected third operation action that is performed by the user on the device, and sending the screen unlock password information of the mobile terminal to the device based on the command.

With reference to the method in the fourth embodiment of the third aspect of the present invention, in a fifth embodiment, the step of allowing, by the mobile terminal, access to the mobile terminal after verification is successful includes: switching, by the mobile terminal, from the third mode to the second mode after verification is successful, so as to allow access of the device.

With reference to the method in any one of the first embodiment to the fifth embodiment of the third aspect of the present invention, in a sixth embodiment, the first input apparatus is a touch display screen, and the second input apparatus is an input apparatus different from the touch display screen.

A fourth aspect of the present invention provides a method for implementing access verification on a device by a mobile terminal, where the method includes: detecting, by the device and the mobile terminal, that the device and the mobile terminal are already connected by using a data cable; and if the mobile terminal detects a first operation action that is performed by a user on a touch display screen of the mobile terminal, allowing the device to access the mobile terminal, namely, gaining, by the device, access to the mobile terminal; or displaying, by the device, a first screen if the mobile terminal detects a second operation action that is performed by the user on an input apparatus different from the touch display screen of the mobile terminal, where the first screen is used to prompt the user to enter a screen unlock password of the mobile terminal, the screen unlock password includes a first password that needs to be entered on the mobile terminal by using the touch display screen and/or a second password that does not need to be entered on the mobile terminal by using the touch display screen of the mobile terminal, obtaining, by the device, the first password that is entered by the user on the device, and/or obtaining, by the mobile terminal, the second password that is entered by the user on the input apparatus different from the touch display screen of the mobile terminal, verifying, by the device, the first password and/or the second password entered by the user, or verifying, by the mobile apparatus, the first password and/or the second password entered by the user, and after verification is successful, allowing the device to access the mobile terminal.

With reference to the method in the first embodiment of the fourth aspect of the present invention, in a second embodiment, the step of displaying, by the device, a first screen includes: displaying, by the device, the first screen after detecting a third operation action that is performed by the user on the device.

With reference to the method in the first embodiment or the second embodiment of the fourth aspect of the present invention, in a third embodiment, the first password is a numerical password and/or a pattern password, and the second password includes a fingerprint password and/or a voiceprint password.

A fifth aspect of the present invention provides a method for implementing access verification on a device by a mobile terminal, including: detecting, by the device and the mobile terminal, that the device and the mobile terminal are already connected by using a data cable; and if the mobile terminal detects a first operation action that is performed by a user on a touch display screen of the mobile terminal, allowing the device to access the mobile terminal; or if the mobile terminal detects a second operation action that is performed by the user on an input apparatus different from the touch display screen of the mobile terminal, generating and displaying, by the device, a first screen if the mobile terminal determines that access verification needs to be performed on the device, to prompt the user to enter a screen unlock password of the mobile terminal on the device, then verifying, by the device or the mobile apparatus, the screen unlock password of the mobile apparatus that is entered by the user on the device, and after verification is successful allowing the device to access the mobile terminal, or if the mobile terminal determines that access verification does not need to be performed on the device, directly allowing the device to access the mobile terminal.

With reference to the method in the first embodiment of the fifth aspect of the present invention, in a second embodiment, the mobile terminal determines, based on whether the mobile terminal is currently in the screen lock state, whether access verification needs to be performed on the device.

A sixth aspect of the present invention provides a device for implementing access verification on the device by a mobile terminal, where the device includes a first processor, a first memory, a device input apparatus, and a first display, where the first memory is configured to store an instruction; and the first processor is configured to perform the following steps according to the instruction: detecting that the device is already connected to the mobile terminal by using a data cable; and after the mobile terminal detects a first operation action that is performed by a user on a first input apparatus of the mobile terminal, gaining, by the device, access to the mobile terminal; or displaying a first screen by using the first display after the mobile terminal detects a second operation action that is performed by the user on a second input apparatus of the mobile terminal, where the first screen is used to prompt the user to enter a screen unlock password of the mobile terminal on the device, obtaining, by using the device input apparatus, and verifying the screen unlock password of the mobile terminal that is entered by the user on the device, or sending, to the mobile terminal for verification, the obtained screen unlock password of the mobile terminal that is entered by the user on the device, and after verification is successful, gaining, by the device, access to the mobile terminal.

With reference to the method in the first embodiment of the sixth aspect of the present invention, in a second embodiment, the step that the first processor displays the first screen includes: displaying the first screen after detecting a third operation action that is performed by the user on the device.

With reference to the method in the second embodiment of the sixth aspect of the present invention, in a third embodiment, the step of displaying the first screen by using the first display when the mobile terminal detects a second operation action that is performed by the user on a second input apparatus of the mobile terminal and the device detects a third operation action that is performed by the user on the device includes: obtaining screen unlock password information of the mobile terminal from the mobile terminal; generating the first screen based on the screen unlock password information of the mobile terminal; and displaying the first screen on the first display apparatus.

With reference to the method in the first embodiment or the second embodiment of the sixth aspect of the present invention, in a third embodiment, the step of sending, to the mobile terminal for verification, the obtained screen unlock password of the mobile terminal that is entered by the user on the first display apparatus includes: sending, to the mobile terminal for verification, the screen unlock password of the mobile terminal that is entered by the user on the device input apparatus; and obtaining a verification result from the mobile terminal.

A seventh aspect of the present invention provides a mobile terminal for implementing access verification on a device, where the mobile terminal includes a first input apparatus, a second input apparatus, a second processor, and a second memory, where
the second memory is configured to store an instruction; and the second processor is configured to perform the following steps according to the instruction: detecting, by the mobile terminal, that the mobile terminal is already connected to the device by using a data cable; and allowing access of the device when a first operation action that is performed by a user on the first input apparatus is detected; or when a second operation action that is performed by the user on the second input apparatus is detected, sending screen unlock password information of the mobile terminal to the device, to display, on the device, a first screen that is used to prompt the user to enter a screen unlock password of the mobile terminal on the device, obtaining and verifying the screen unlock password of the mobile terminal that is entered by the user on the device, or obtaining a verification result of the device for the screen unlock password of the mobile terminal that is entered by the user on the device, and allowing access of the device after verification is successful.

With reference to the mobile terminal in the first embodiment of the seventh aspect of the present invention, in a second embodiment, the step that the second processor allows access of the device in response to the detected first operation action that is performed by the user on the first input apparatus includes: switching from a first mode to a second mode in response to the detected first operation action that is performed by the user on the first input apparatus, so as to allow access of the device.

With reference to the mobile terminal in the first embodiment or the second embodiment of the seventh aspect of the present invention, in a third embodiment, the step that the second processor sends the screen unlock password information of the mobile terminal to the device includes: receiving a request message that is sent by the device based on a detected third operation action that is performed by the user on the device; and sending the screen unlock password information of the mobile terminal to the device according to the request message.

With reference to the mobile terminal in the third embodiment of the seventh aspect of the present invention, in a fourth embodiment, the step that the second processor sends the screen unlock password information of the mobile terminal to the device includes: in response to the detected second operation action that is performed by the user on the second input apparatus, and the step that the device detects a third operation action that is performed by the user on the device, and sends screen unlock password information of the mobile terminal to the device includes: switching from the first mode to a third mode in response to the detected second operation action that is performed by the user on the second input apparatus; and receiving, in the third mode, a command that is sent by the device in response to the detected third operation action that is performed by the user on the device, and sending the screen unlock password information of the mobile terminal to the device based on the command.

With reference to the mobile terminal in any one of the fourth embodiment of the seventh aspect of the present invention, in a fifth embodiment, the step that the second processor allows access to the mobile terminal after verification is successful includes: switching from the third mode to the second mode after verification is successful, so as to allow access of the device.

With reference to the method in any one of the first embodiment to the fifth embodiment of the seventh aspect of the present invention, in a sixth embodiment, the first input apparatus is a touch display screen, and the second input apparatus is an input apparatus different from the touch display screen.

An eighth aspect of the present invention provides a device for implementing access verification on the device by a mobile terminal, where the device includes a first connection detection module, configured to detect that the device is connected to the mobile terminal by using a data cable; a first access verification module, configured to: when the mobile terminal detects a first operation action that is performed by a user on a first input apparatus of the mobile terminal, gain, for the device, access to the mobile terminal; and a second access verification module, configured to display a first screen after the mobile terminal detects a second operation action that is performed by the user on a second input apparatus of the mobile terminal, where the first screen is used to prompt the user to enter a screen unlock password of the mobile terminal on the device, obtain and verify the screen unlock password of the mobile terminal that is entered by the user on the device, or send, to the mobile terminal for verification, the obtained screen unlock password of the mobile terminal that is entered by the user on the device, and after verification is successful, gain, for the device, access to the mobile terminal.

With reference to the method in the first embodiment of the eighth aspect of the present invention, in a second embodiment, the second access verification module is configured to display the first screen after a third operation action that is performed by the user on the device is detected.

With reference to the method in the first embodiment or the second embodiment of the eighth aspect of the present invention, in a third embodiment, the second access verification module includes: an information obtaining unit, configured to obtain screen unlock password information of the mobile terminal from the mobile terminal; a generation unit, configured to generate the first screen based on the screen unlock password information of the mobile terminal; and a display unit, configured to display the first screen on a display apparatus.

With reference to the method in any one of the first embodiment to the third embodiment of the eighth aspect of the present invention, in a fourth embodiment, the second access verification module includes: a sending unit, configured to send, to the mobile terminal for verification, the screen unlock password of the mobile terminal that is entered by the user on the device; and a result obtaining unit, configured to obtain a verification result from the mobile terminal.

With reference to the method in any one of the first embodiment to the fourth embodiment of the eighth aspect of the present invention, in a fifth embodiment, the first input apparatus is a touch display screen, and the input apparatus is an input apparatus different from the touch display screen.

A ninth aspect of the present invention provides a mobile terminal for implementing access verification on a device by the mobile terminal, where the mobile terminal includes: a second connection detection module, configured to detect that the mobile terminal is already connected to the device by using a data cable; a third access verification module, configured to: when detecting that the mobile terminal is connected to the device by using a data cable, allow access of the device when a first operation action that is performed by a user on a first input apparatus of the mobile terminal is detected; and a fourth access verification module, configured to: when a second operation action that is performed by the user on a second input apparatus of the mobile terminal is detected, and the device detects a third operation action that is performed by the user on the device, send screen unlock password information of the mobile terminal to the device, to display, on the device, a first screen that is used to prompt the user to enter a screen unlock password of the mobile terminal on the device, obtain and verify the screen unlock password of the mobile terminal that is entered by the user on the device, or obtain a verification result of the device for the screen unlock password of the mobile terminal that is entered by the user on the device, and allow access of the device after verification is successful.

With reference to the method in the first embodiment of the eighth aspect of the present invention, in a second embodiment, the third access verification module includes a first switching unit, configured to switch from a first mode to a second mode in response to the detected first operation action that is performed by the user on the first input apparatus of the mobile terminal, so as to allow access of the device.

With reference to the method in the first embodiment or the second embodiment of the eighth aspect of the present invention, in a third embodiment, the fourth access verification module includes: a second switching unit, configured to switch from the first mode to a third mode in response to the detected second operation action that is performed by the user on the second input apparatus of the mobile terminal; an information sending unit, configured to receive, in the third mode, a command that is sent by the device in response to the detected third operation action that is performed by the user on the device, and send the screen unlock password information of the mobile terminal to the device based on the command.

A tenth aspect of the present invention provides a system for implementing access verification on a device by a mobile terminal, where the system includes the device and the mobile terminal and the device and the mobile terminal are configured to: the device and the mobile terminal detect that the device and the mobile terminal are already connected by using a data cable. When the mobile terminal detects a first operation action that is performed by a user on a touch display screen of the mobile terminal, the device is allowed to access the mobile terminal. When the mobile terminal detects a second operation action that is performed by the user on an input apparatus different from the touch display screen of the mobile terminal, and the device detects a third operation action that is performed by the user on the device, the device displays a first screen. The first screen is used to prompt the user to enter a screen unlock password of the mobile terminal on the device. The device or the mobile apparatus verifies the screen unlock password of the mobile apparatus that is entered by the user on the device, and after verification is successful, the device is allowed to access the mobile terminal.

An eleventh aspect of the present invention provides a system for implementing access verification on a device by a mobile terminal, where the system includes the device and the mobile terminal, and the device and the mobile terminal are configured to: the device and the mobile terminal detect that the device and the mobile terminal are already connected by using a data cable. When the mobile terminal detects a first operation action that is performed by a user on a touch display screen of the mobile terminal, the device is allowed to access the mobile terminal. When the mobile terminal detects a second operation action that is performed by the user on an input apparatus different from the touch display screen of the mobile terminal, and the device detects a third operation action that is performed by the user on the device, the device displays a first screen. The first screen is used to prompt the user to enter a screen unlock password of the mobile terminal, and the screen unlock password includes a first password that needs to be entered on the mobile terminal by using the touch display screen and/or a second password that does not need to be entered on the mobile terminal by using the touch display screen of the mobile terminal. The device obtains the first password that is entered by the user on the device, and/or the mobile terminal obtains the second password that is entered by the user on the input apparatus different from the touch display screen of the mobile terminal. The device verifies the first password and/or the second password entered by the user, or the mobile apparatus verifies the first password and/or the second password entered by the user. After verification is successful, the device is allowed to access the mobile terminal.

A twelfth aspect of the present invention provides a system for implementing access verification, where the system includes a mobile terminal and a device. The mobile terminal includes a screen lock module, a USB control module, and a physical button input module. The device includes a data export module, a connection module, and a broken screen functional module. The physical button input module is configured to detect an operation action performed by a user on a physical button, and send a signal to the USB control module, to trigger the USB control module to switch a mode of the mobile terminal. The broken screen functional module is configured to provide a user operation interface, prompt the user to enter a screen unlock password, and send the screen unlock password to the USB control module of the mobile terminal by using the connection module. The USB control module sends the screen unlock password entered by the user to the screen lock module for verification, and after verification is successful, allows the device to perform connection and input management. The USB control module is connected to the connection module of the device by using a USB data cable after verification of the screen lock module is successful. The device implements, by using the connection module, a function of connecting to the mobile terminal. The data export module is configured to export data of the mobile device by using the connection module.

A thirteenth aspect of the present invention provides a computer program product, where when the computer program product runs on a device, the device performs the method according to any embodiment of the second aspect.

A fourteenth aspect of the present invention provides a computer program product, where when the computer program product runs on a mobile terminal, the mobile terminal performs the method according to any embodiment of the third aspect.

In conclusion, in the embodiments of the present invention, the mobile terminal is connected to the device by using the data cable. When the first operation action that is performed by the user on the first input apparatus of the mobile terminal is detected, access verification is implemented by the mobile device. When the second operation action that is performed by the user on the second input apparatus of the mobile terminal is detected, access verification is also securely implemented in a manner of displaying a prompt screen on a device side and obtaining the screen unlock password entered by the user. In this way, a plurality of secure access verification operation manners are provided, so as to provide the user with a more convenient interaction process. In addition, when the first input apparatus is faulty, access verification can still be securely implemented, and an operation such as data export can be performed, thereby improving use experience of the user.

BRIEF DESCRIPTION OF DRAWINGS

To describe the technical solutions in the embodiments of the present invention more clearly, the following briefly describes the accompanying drawings required for describing the embodiments.

Figure 1:
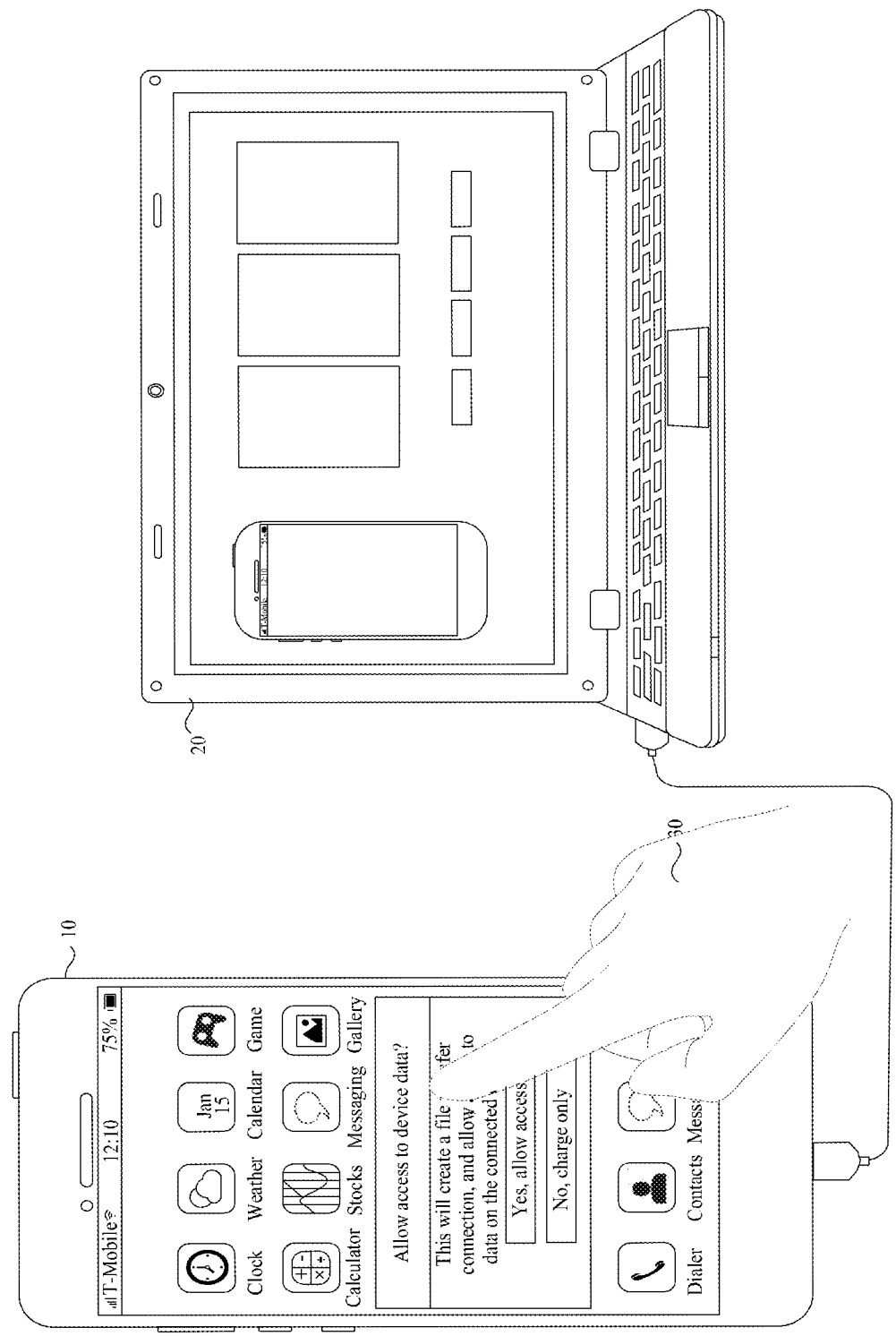
FIG. 1 shows an access verification method when a mobile phone is connected to a computer in the prior art.

In the drawings, identical reference numerals denote corresponding parts. Apparently, the accompanying drawings in the following description show merely some but not all embodiments of the present invention. A person of ordinary skill in the art may still derive other drawings from these accompanying drawings without creative efforts.

DESCRIPTION OF EMBODIMENTS

Figure 2:
FIG. 2 is a schematic diagram of a screen displayed on a mobile phone in a process of connecting the mobile phone to a computer by using a data cable in the prior art.
Figure 3:
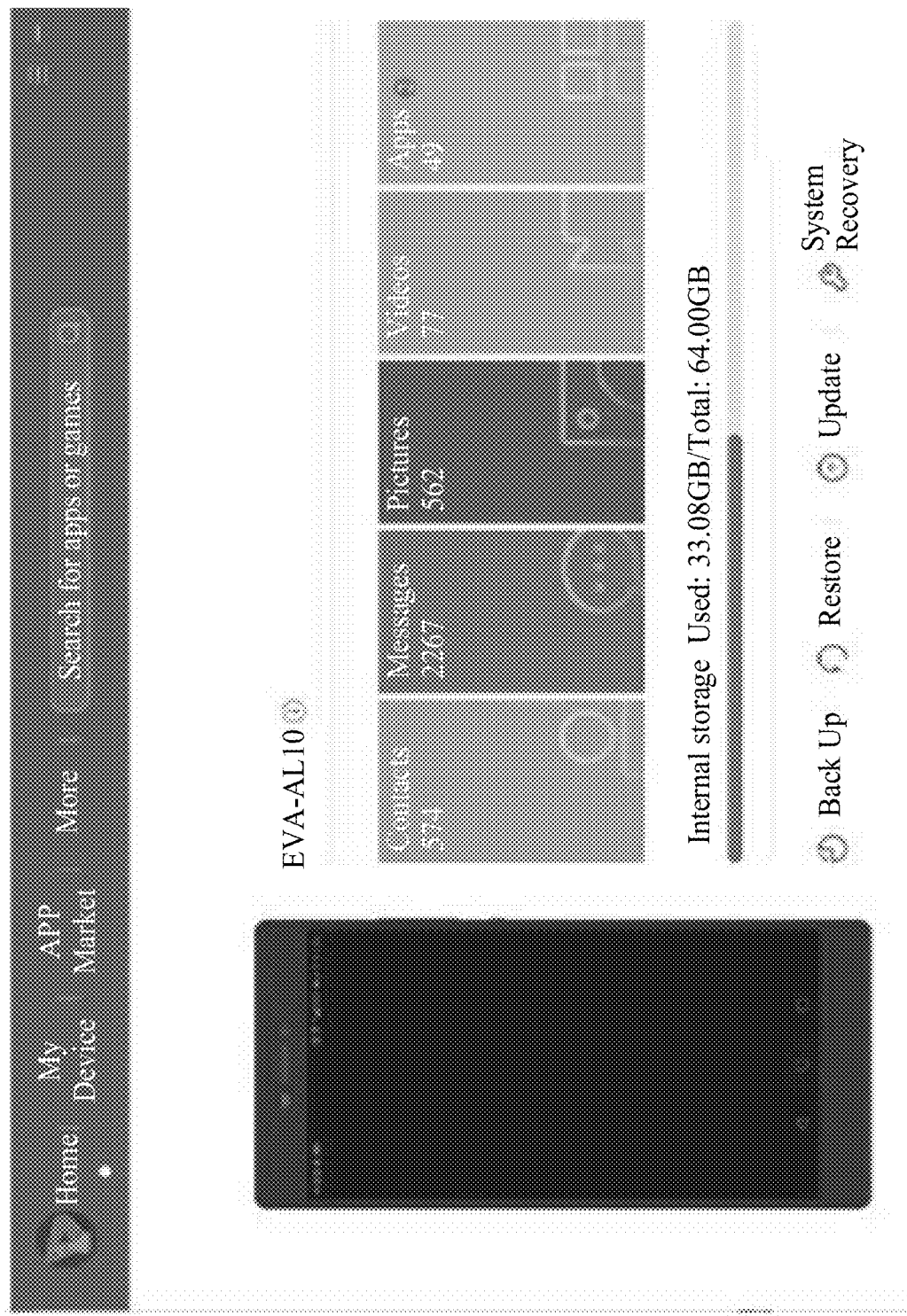
FIG. 3 is a schematic diagram of a screen displayed on a computer in a process of connecting a mobile phone to the computer by using a data cable in the prior art.

FIG. 1 shows an access verification method when a mobile phone is connected to a computer in the prior art. When the mobile phone is connected to the computer, a prompt screen is displayed on a display screen of the mobile phone. A prompt screen displayed on a specific mobile phone is shown in FIG. 2. The mobile phone obtains an operation action that is performed by a hand 30 of a user on the display screen according to the prompt screen. For example, when the mobile phone obtains a tap of the user in an area of "Yes, allow access" in the prompt screen on the display screen, access verification on the computer by a mobile phone side is successful. After access is allowed, the computer is allowed to access data in the mobile phone, and a computer side may perform, according to a user operation, an operation on the mobile phone, such as data viewing, data obtaining, data backup, data restoring, system update, or system recovery. A corresponding operation interface may be displayed on the computer. An operation interface displayed on a specific computer is shown in FIG. 3.

Figure 4:
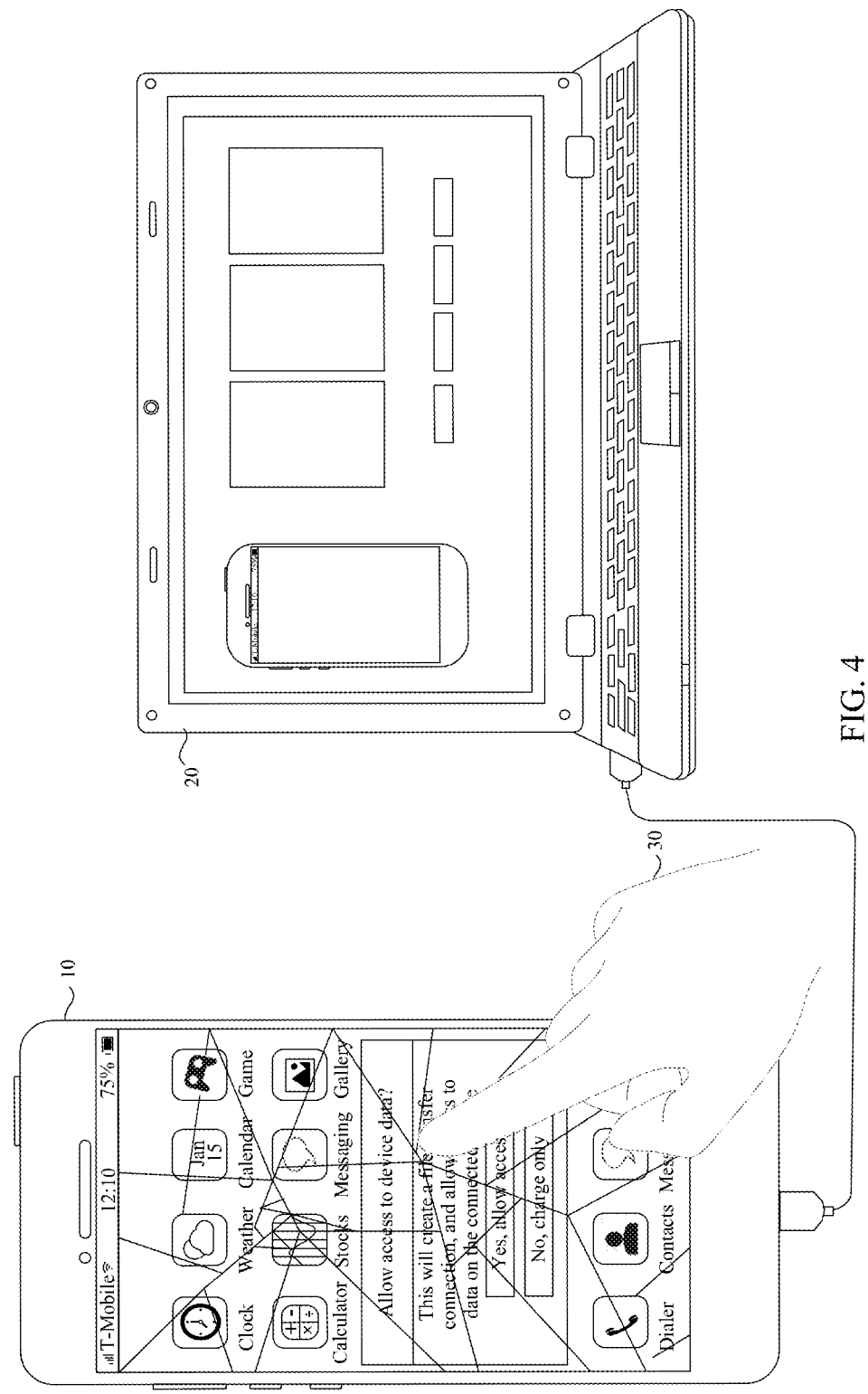
FIG. 4 is a schematic diagram of a scenario of connecting a mobile phone to a computer by using a data cable when a display screen of the mobile phone is damaged according to an embodiment of the present invention.

However, as shown in FIG. 4, after a display screen of a mobile phone is damaged, an input function of the display screen of the mobile phone fails, and even the display screen of the mobile phone becomes a black screen. A computer cannot access the mobile phone without permission, and the mobile phone cannot normally obtain an operation performed by a hand 30 of a user on the display screen. As a result, the mobile phone cannot recognize the computer.

In addition, the computer has a larger display. After the mobile phone is connected to the computer, the user prefers to perform an operation on the computer. Secure access verification on the computer by the mobile phone that is implemented through verification interaction provided on the computer provides a more convenient interaction process for the user, thereby improving use experience of the user.

With reference to the foregoing description, the embodiments of the present invention provide a method for implementing access verification on a device by a mobile terminal, a mobile terminal, and a device. The technical solutions in the embodiments of the present invention are further described below with reference to the accompanying drawings in some embodiments.

In the embodiments of the present invention, the mobile terminal is a mobile communications terminal, and is a computer device that can be used in moving. Mobility of the mobile terminal is mainly reflected in a mobile communications capability and a portable size. The mobile terminal may be a mobile phone, a notebook, a PDA (Personal Digital Assistant, personal digital assistant), a POS (Point of Sales, point of sales), an in-vehicle computer, a smart wearable device (such as a smart band), or the like. For ease of understanding, the following embodiments are described by using the mobile phone as an example.

Figure 5:
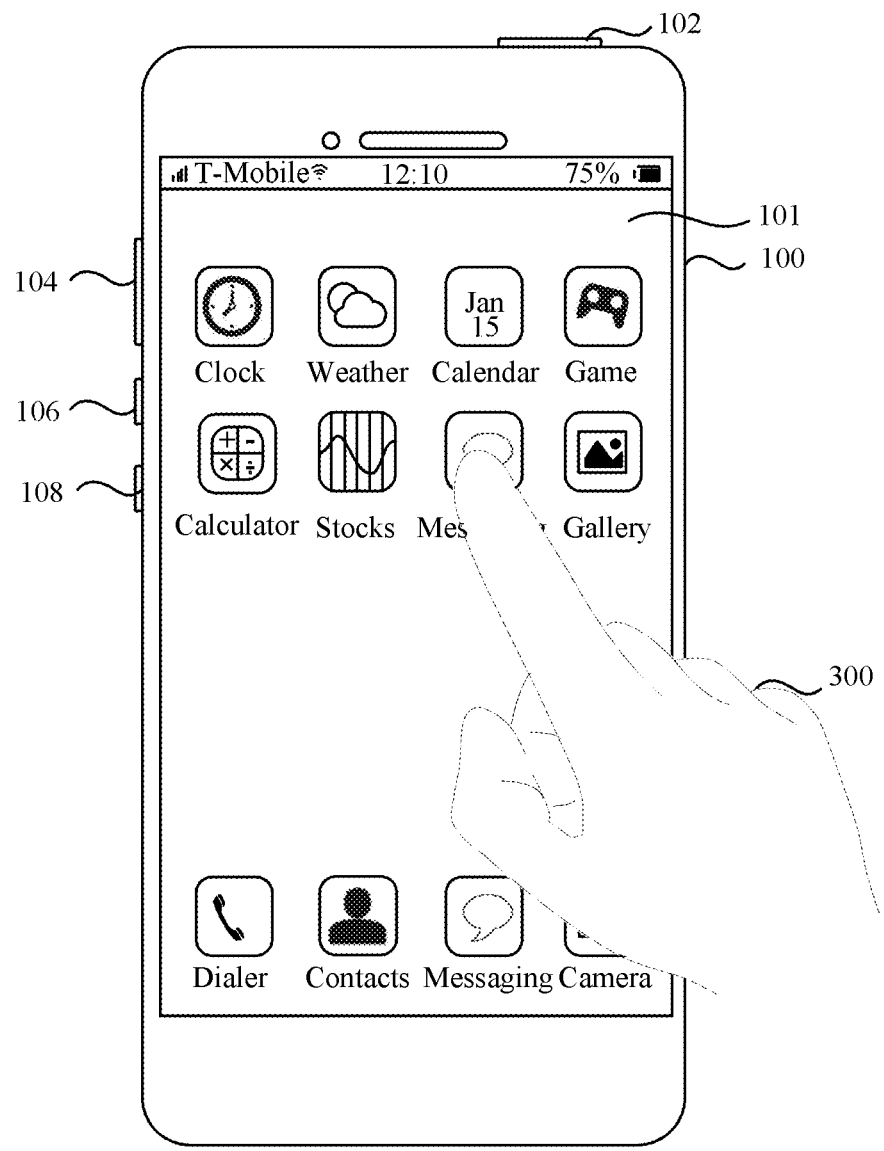
FIG. 5 is a schematic diagram of an appearance of a mobile terminal according to an embodiment of the present invention.

FIG. 5 is a schematic diagram of an appearance of a mobile terminal according to an embodiment of the present invention. It is assumed that the mobile terminal is a mobile phone. The mobile phone includes a touch display apparatus 101, a power button 102, a screen lock button 104, a volume up button 106, and a volume down button 108. The touch display apparatus 101 displays a screen for interacting with a user, and obtains an operation action, such as a tap and a slide, that is performed by a finger 300 of the user on the touch display apparatus 101. The power button 102, the screen lock button 104, the volume up button 106, and the volume down button 108 are physical buttons, and can also obtain a press operation that is performed by the finger 110 of the user on the buttons.

The device is a computer device having a data processing capability. The device may be a notebook computer or a desktop computer. Certainly, the device may alternatively be a mobile terminal. In the embodiments of the present invention, the device is configured to: when the device is connected to the mobile terminal by using a data cable, access the mobile terminal, and control the mobile terminal to perform a function or export data from the mobile terminal. For ease of understanding, the following embodiments are described by using a computer as an example.

Figure 6:
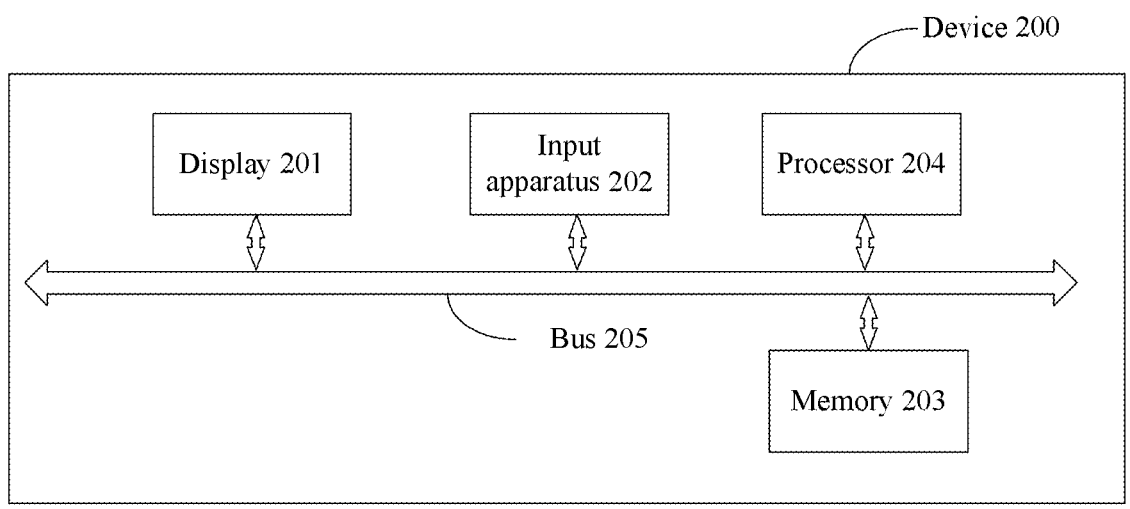
FIG. 6 is a schematic structural diagram of a device according to an embodiment of the present invention.

FIG. 6 is a schematic structural diagram of a device according to an embodiment of the present invention. The device 200 includes a display 201, an input apparatus 202, a memory 203, a processor 204, and a bus 205.

The display 201 may be a suitable apparatus such as a cathode ray tube (CRT, Cathode Ray Tube) display, a liquid crystal display (LCD, Liquid Crystal Display), or a touchscreen (Touch Screen), and receives an instruction by using the bus 205 to enable a screen of the display to present a graphical user interface. The input apparatus 202 may include any suitable apparatus such as a keyboard, a mouse, a track recognizer, or a speech recognition interface, and is configured to receive input of the user, generate control input, and send the control input to the processor or another component by using the bus 205. Displays of some devices 200 have touchscreens, and the displays are also input apparatuses. In addition, the memory 203 may include a RAM and a ROM, or any fixed storage medium or moveable storage medium, and is configured to store a program capable of executing the embodiments of the present invention or an application database of the embodiments of the present invention, and receives, by using the bus 205, input of another component or stored information that is invoked by another component. The processor 204 is configured to execute the program of the embodiments of the present invention stored in the memory 203, and perform bidirectional communication with another apparatus by using the bus. The memory 203 and the processor 204 may also be integrated into a physical module that the embodiments of the present invention are applied to, and the physical module stores and runs the program that implements the embodiments of the present invention. Components of the apparatus 200 are coupled together by using the bus system 205. The bus system 205 may include, in addition to a data bus, a power bus, a control bus, a status signal bus, and the like. However, for clear description, various types of buses in the figure are marked as the bus system 205.

The mobile terminal is also a device. For an inner structure of the mobile terminal, refer to descriptions of the device of FIG. 6, and details are not described again.

Figure 7:
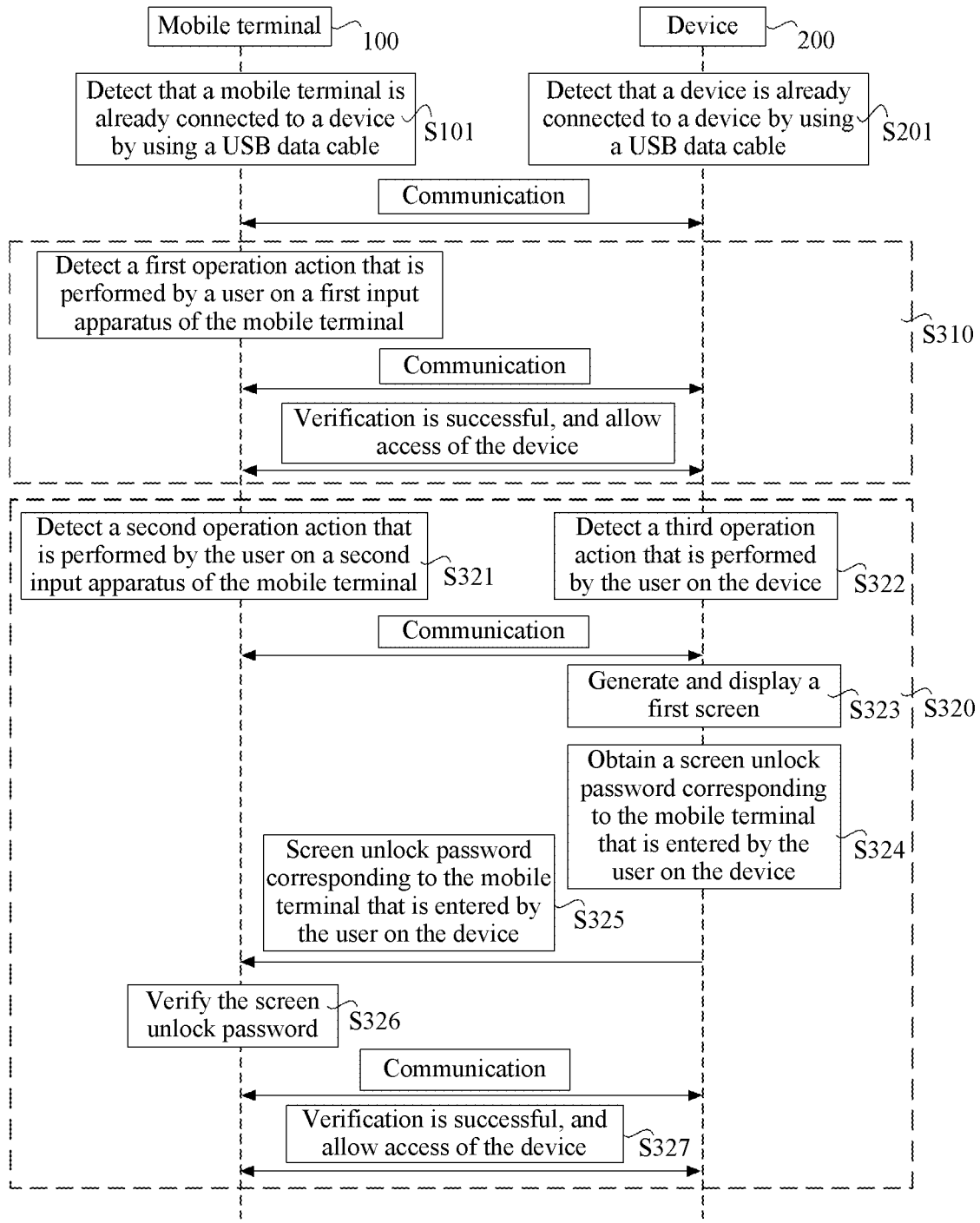
FIG. 7 is a schematic flowchart of access verification between a mobile terminal 100 and a device 200 according to some embodiments of the present invention.

FIG. 7 is a schematic flowchart of access verification between a mobile terminal 100 and a device 200 according to an embodiment of the present invention.

First, in S101 and S201, the mobile terminal 100 is connected to the device 200 by using a data cable, and the mobile terminal 100 and the device 200 separately detect that the mobile terminal 100 and the device 200 are already connected to each other by using a USB data cable.

In this embodiment of the present invention, the data cable may use a USB (universal serial bus, Universal Serial Bus) interface, and is referred to as a USB data cable. The data cable may alternatively use a COM (serial interface, Component Object Mode) interface. For ease of understanding, the following embodiments are described by using a USB data cable as an example.

Specifically, the mobile terminal 100 may determine, by monitoring voltage of a USB interface in a USB module of the mobile terminal 100, whether the USB data cable has been plugged in, and determine, based on a battery charging specification (such as the BC1.2 charging specification), whether a charger or a device (such as a notebook computer or a desktop computer) is currently connected by using the USB data cable.

Correspondingly, the device 200 may also detect, by using a similar detection method, that the device 200 is already connected to the mobile terminal 100 by using the USB data cable.

Then, in S310, when the device and the mobile terminal detect that the device and the mobile terminal are already connected by using the data cable, the mobile terminal 100 detects an operation action that is performed by a user on the mobile terminal 100, and performs corresponding access verification based on the detected operation action.

In an embodiment of this application, that the device 200 determines whether the mobile terminal 100 detects a corresponding operation action (such as a first operation action or a second operation action) may be understood as that the device 200 learns the corresponding operation action detected by the mobile terminal 100. A determining process may be: the device 200 sends a query message to the mobile terminal 100, and the mobile terminal 100 returns a response message based on the query message: or the device 200 waits for and receives a notification message proactively sent by the mobile terminal 100. Correspondingly, that the mobile terminal 100 determines whether the device detects a corresponding operation action may also be determined by the mobile terminal 100.

In some embodiments, in S310, the mobile terminal 100 detects a first operation action that is performed by the user on a first input apparatus of the mobile terminal, sends a first response message to the device 200, and allows access of the device 200.

Specifically, the first operation action may be an interactive operation action that is detected by the mobile terminal and that meets a preset condition. The first input apparatus may be a touch display screen. The touch display screen of the mobile terminal displays a prompt screen step by step, and detects a series of operation actions, such as a tap and a slide, that are performed on the touch display screen by a hand of the user according to the prompt screen. Then, if a processor of the mobile terminal determines that the series of operation actions are interactive actions that meet the preset condition, the mobile terminal completes access verification on the device, and allows the device to perform verification process.

The first operation action may be preset before factory delivery, or may be set by the user on a "Settings" screen provided in a system of the mobile terminal.

In addition, the first input apparatus may alternatively be another input apparatus of the terminal device, such as a physical button, a speech input apparatus, a gravity sensing apparatus, a motion sensing apparatus, or a gesture recognition apparatus.

In descriptions of the embodiments of the present invention, that the mobile terminal 100 detects a specific operation action may be implemented by using the following method: An input apparatus of the mobile terminal 100 receives a corresponding input action, for example, the touch display screen senses, based on a change of voltage or capacitance of the touch display screen, a touch action that is performed by a finger on the touch display screen, or a microphone receives input voice; then the input apparatus converts the received input action into a corresponding electrical signal and sends the electrical signal to the processor: and the processor parses the electrical signal, converts the electrical signal into logic corresponding to the input action, and determines whether the input action meets a preset operation action. For example, the mobile terminal 100 determines that a corresponding operation action is detected. The processor may be a core processor of the mobile terminal 100, a processor independently disposed for each input apparatus, or a combination of a core processor and an independent processor.

After the terminal device 100 detects that the user performs the corresponding first operation action on the first input apparatus according to a screen prompt, a speech prompt, or the like of the terminal device, access verification on the device 200 by the mobile terminal 100 is successful, and the mobile terminal 100 allows access of the device 200, and sends the first response message to the device by using the USB data cable, to notify the device 200. After receiving the first response message, the device 200 determines that the mobile terminal detects the first operation action that is performed by the user on the first input apparatus of the mobile terminal that access verification is completed, and that the device 200 is allowed to access the mobile terminal 100.

After access verification is successful, the mobile terminal 100 may switch from a first mode to a second mode. The second mode is a mode in which the mobile terminal is ready to allow access of the device after security authentication. In the second mode, access of the device 200 is allowed. An access process may include obtaining, modifying, deleting, and adding data, and the like. Certainly, based on different access permissions of the mobile terminal 100 to the device 200, the mobile terminal 100 may specify data that the device 200 is allowed to access.

Figure 8A:
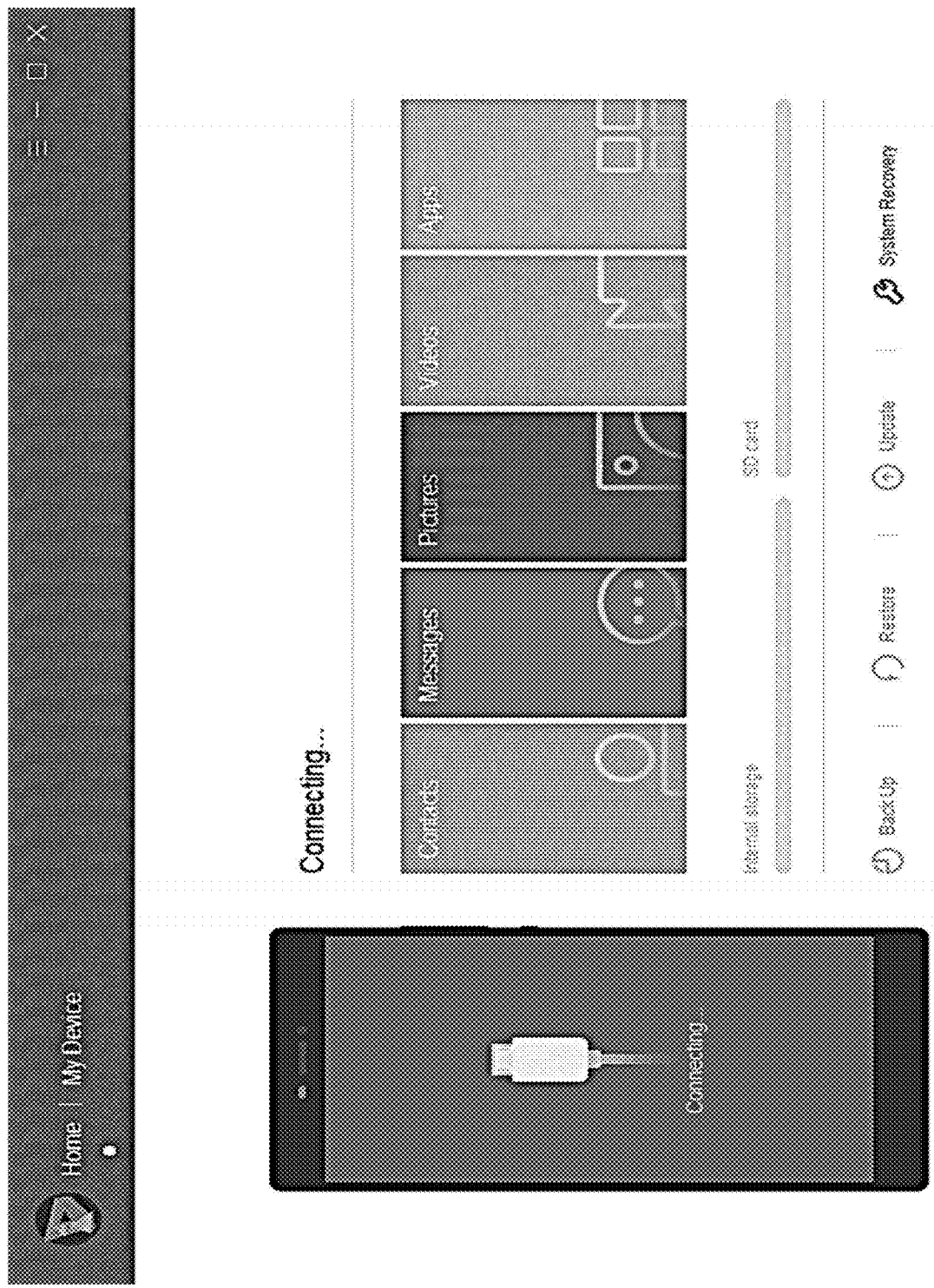
FIG. 8a to FIG. 8i are schematic diagrams of screens in a process of connecting a mobile phone to a computer by using a USB according to a specific embodiment of the present invention.
Figure 8B:
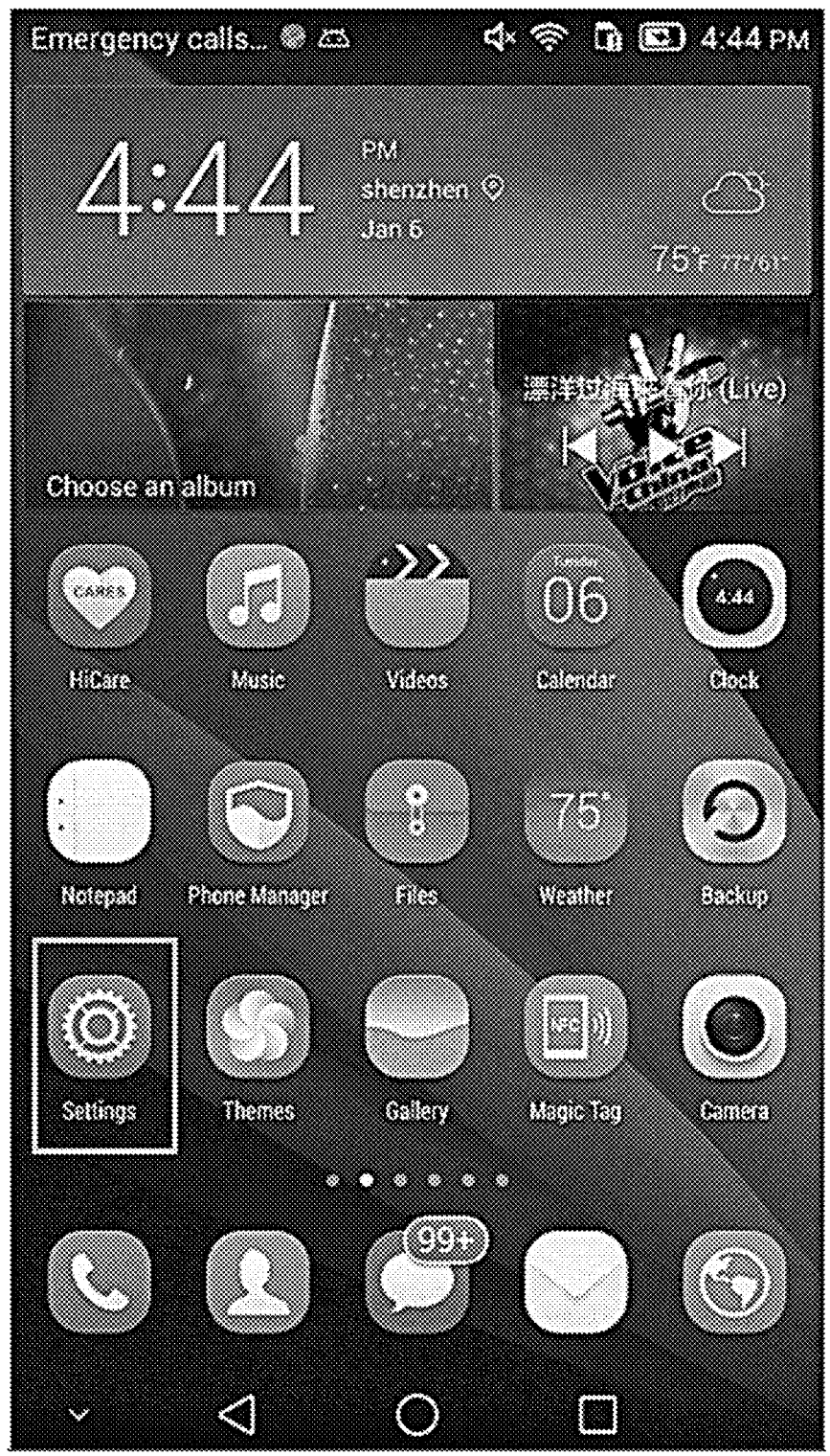
Figure 8C:
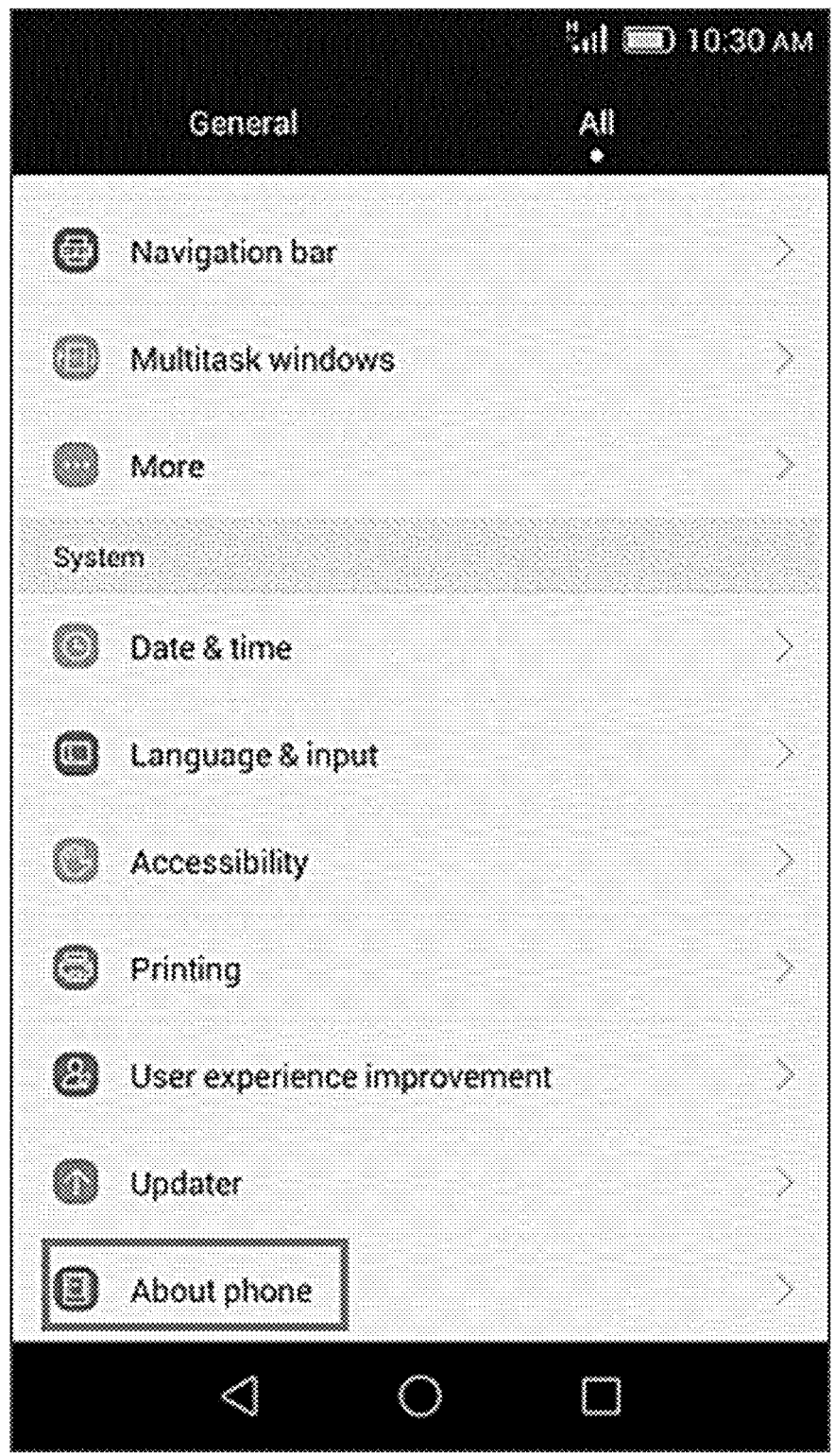
Figure 8D:
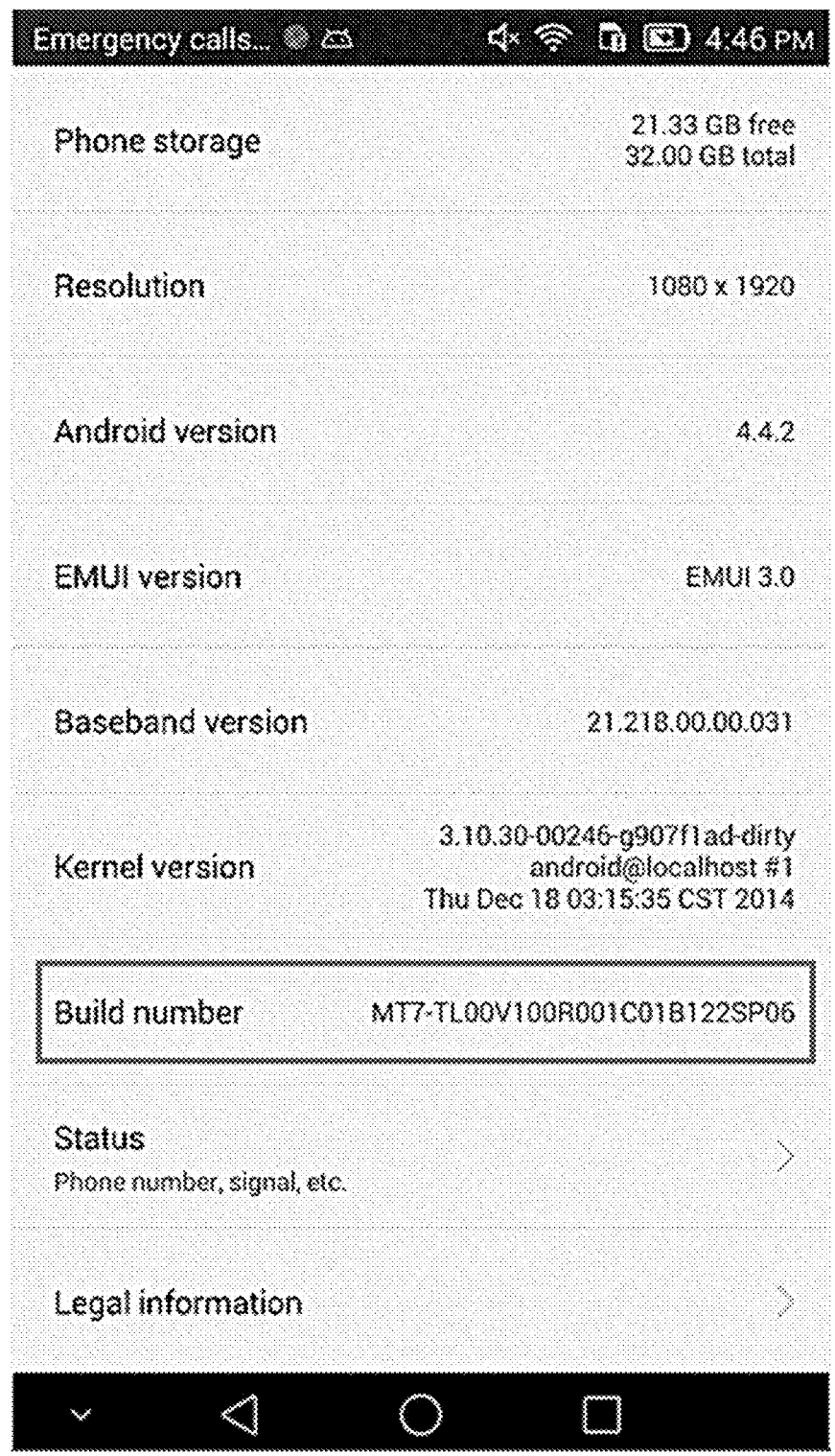
Figure 8E:
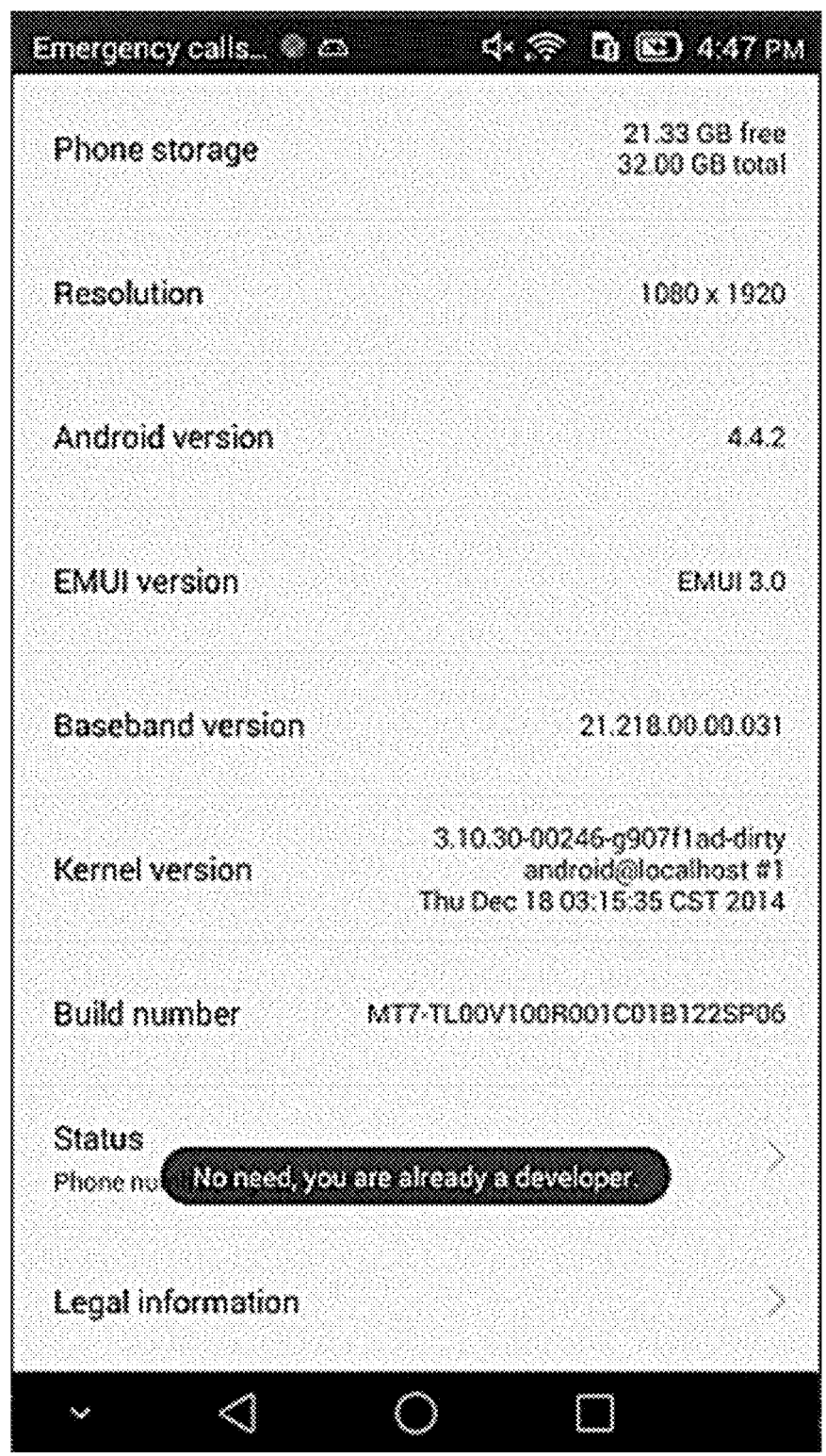
Figure 8F:
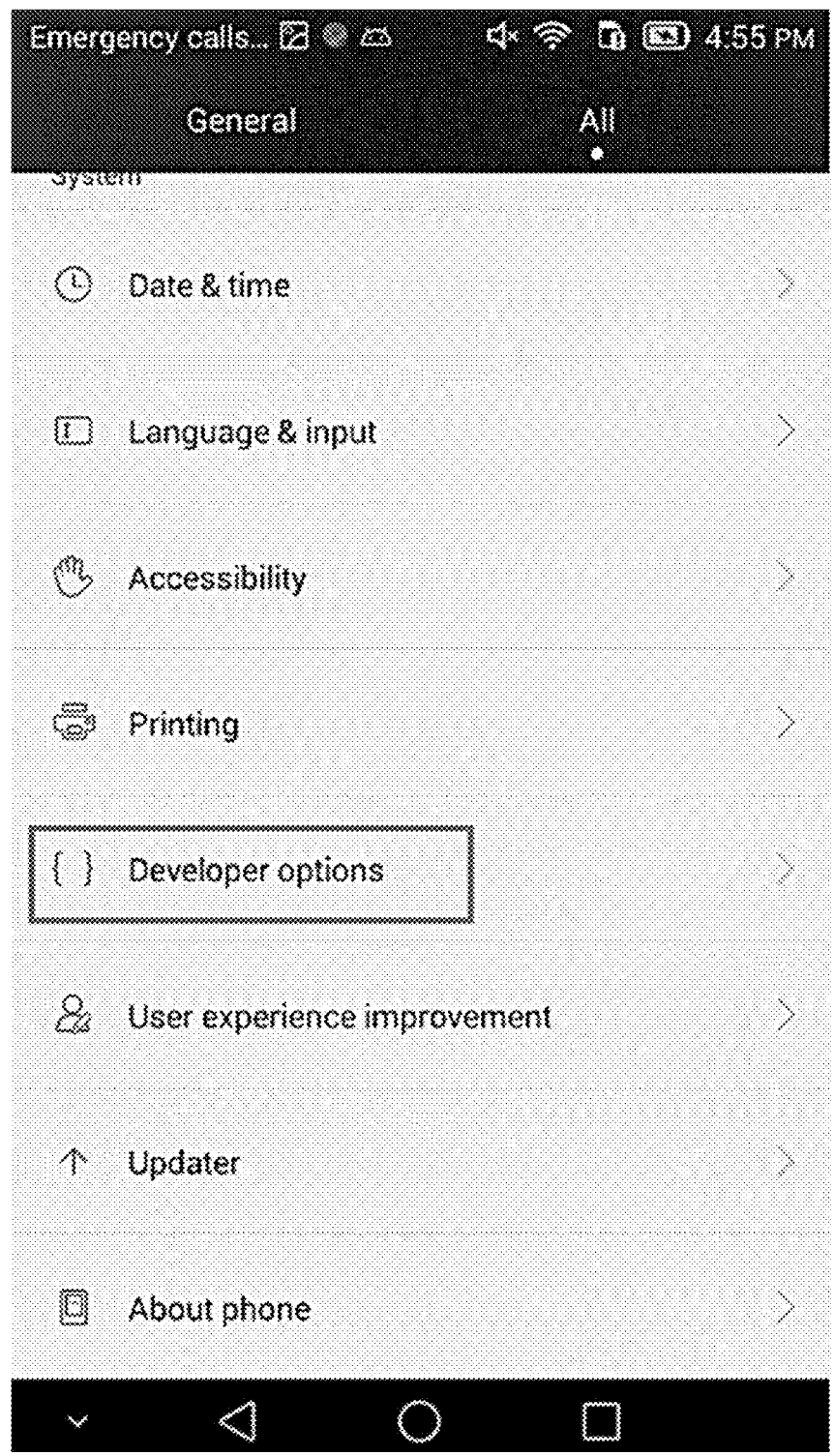
Figure 8G:
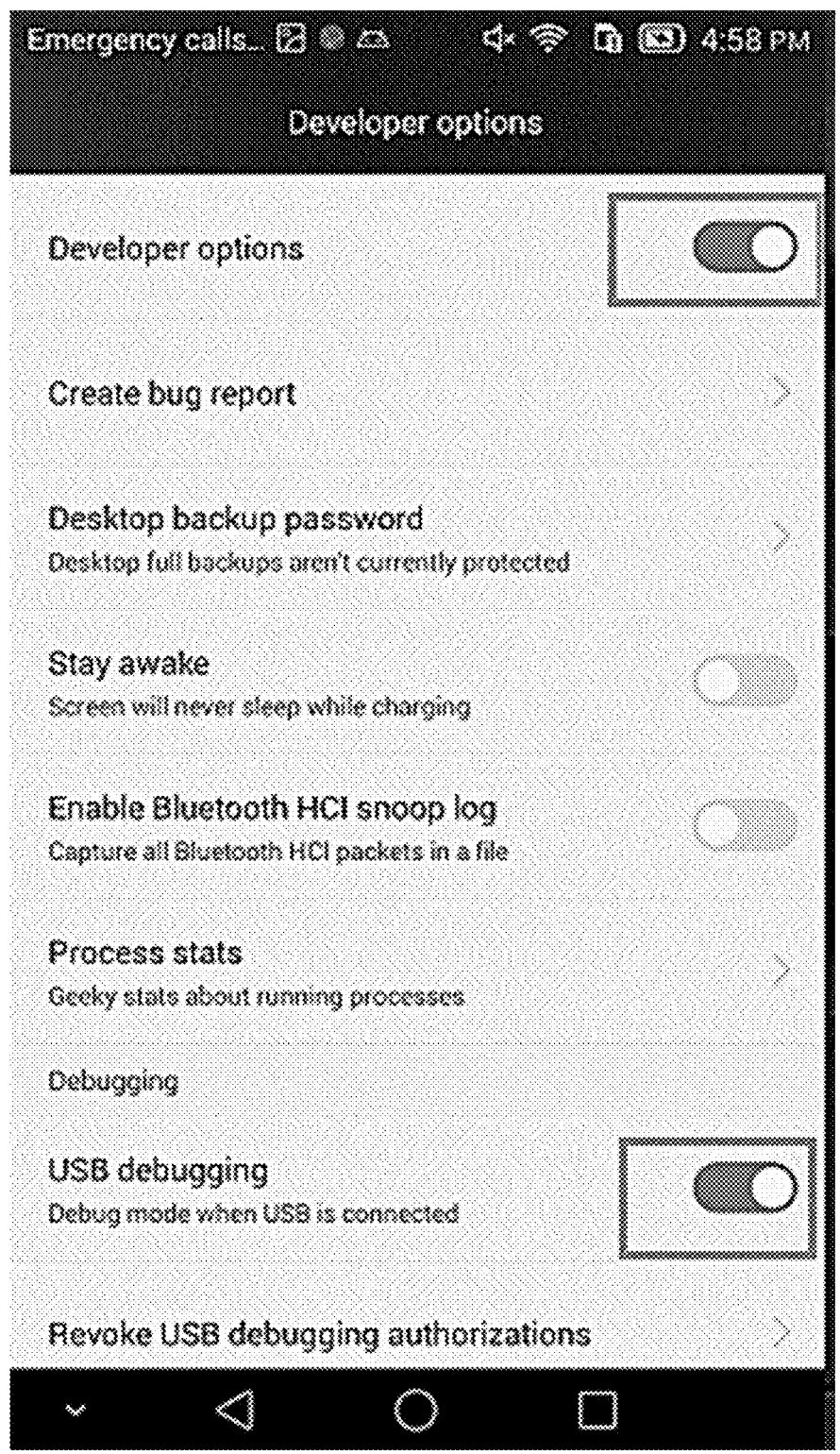
Figure 8H:
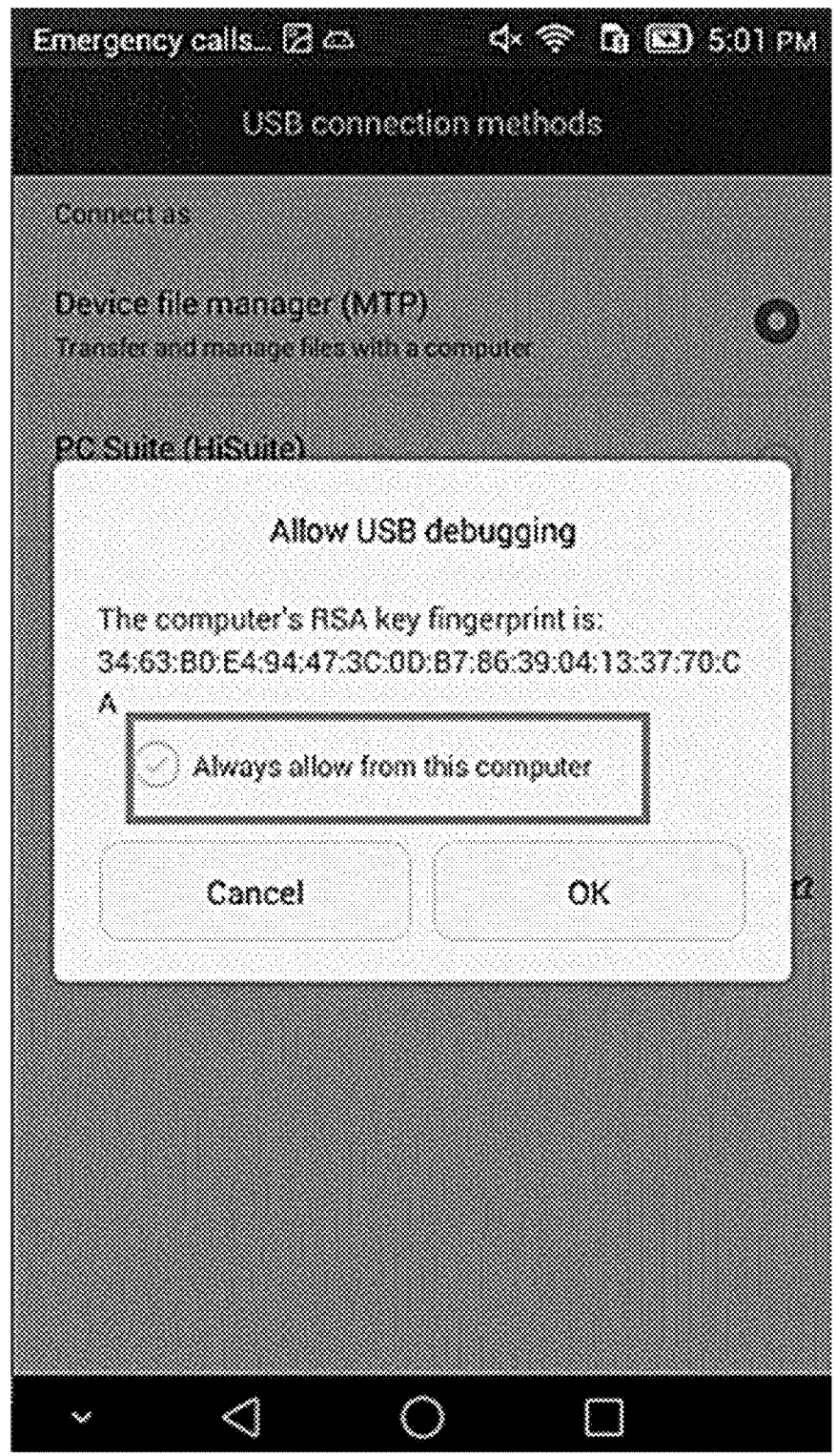
Figure 8I:
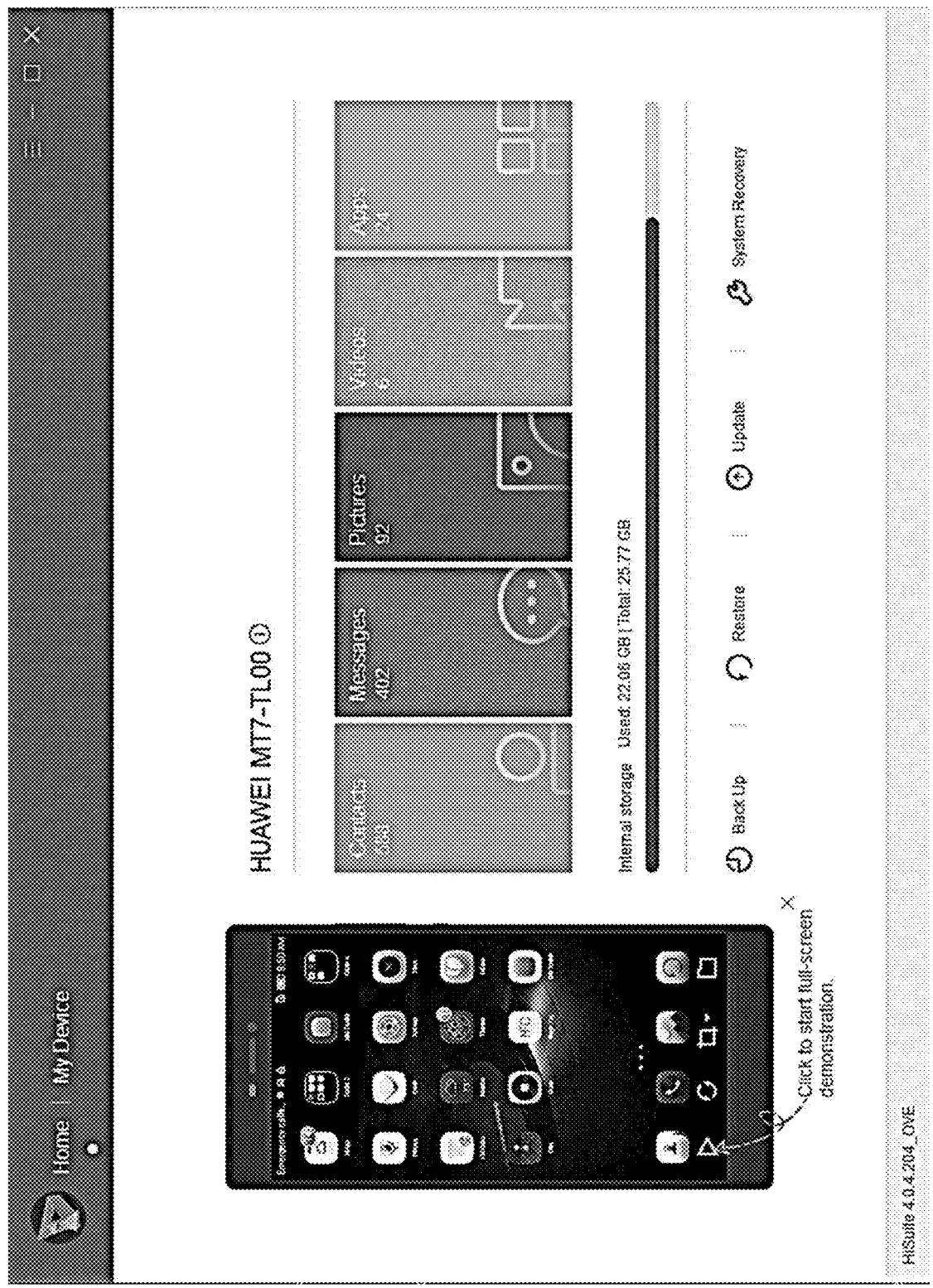

With reference to FIG. 8a to FIG. 8i, in a specific embodiment, a computer has software (such as a mobile phone assistant application) for accessing a mobile phone. When the mobile phone is connected to the computer, a prompt dialog box pops up on the computer, to prompt that a device currently accesses the computer by using a USB data cable. If the mobile phone assistant application is started in this case, a screen shown in FIG. 8a is displayed on a computer screen, where "Connecting . . . " represents having detected that the computer is already connected to the mobile phone by using the USB data cable and waiting for access verification. As shown in FIG. 8b, the mobile phone 200 displays a desktop screen. After it is detected that a user taps "Setting" on a desktop, a setting screen shown in FIG. 8c is displayed. After it is detected that the user taps "About phone" on the setting screen, an "About phone" screen shown in FIG. 8*d* is displayed. After it is detected that the user continually taps "Build number" for several times on the "About phone" screen, prompt information "No need, you are already a developer." (not need any more taps, you are already in the debugging state) shown in FIG. 8*e* is displayed. Then, in response to an operation that is performed by the user and that requests to return to the "Settings" screen (namely, it is detected that the user taps a return button), a screen shown in FIG. 8*f* is displayed. In response to a user tap on "Developer options", a "Developer options" screen shown in FIG. 8*g* is displayed. Then, in response to a user tap on a checkbox of "USB debugging", a screen shown in FIG. 8*h* is displayed. In response to a user tap on "OK", the mobile terminal 100 switches to the "USB debugging mode" (USB debugging), and then the mobile phone and the device 200 are connected after access verification is completed. Optionally, an option "Always allow from this computer" (always allow from this computer) is further displayed on the screen, to facilitate each subsequent connection.

In the foregoing interaction process, a series of corresponding operations performed by the user may be considered as the first operation action mentioned in this embodiment of the present invention. After the foregoing detected first operation action is responded to, the mobile terminal 100 and the device 200 are connected after access verification is completed. For example, the mobile phone may send a response message to the computer after switching to the USB debugging mode. After receiving the response message, the computer determines that the mobile terminal 100 detects that the user has performed the first operation action, and determines that the mobile phone completes access verification and allows access, and the computer starts to access the mobile phone. Then, a displayed screen may be shown in FIG. 8*i*.

Certainly, the foregoing access verification process shown in FIG. 8*a* to FIG. 8*i* is an example for ease of understanding, and content and a language displayed on the prompt screen are not limited.

In some possible implementations, when it is detected that the mobile terminal 100 and the device 200 are already connected by using the data cable, prompt information may be displayed on a display apparatus of the mobile terminal 100 or a display apparatus of the device 200, to prompt the user to perform a corresponding operation action on the mobile terminal, and details are not described again.

If the mobile terminal 100 does not detect the first operation action, as shown in S320, when the mobile terminal 100 detects a second operation action that is performed by the user on a second input apparatus of the mobile terminal 100, the device 200 needs to be used to prompt the user to enter, on the device 200, a password of the mobile terminal for access verification.

In some embodiments, if the mobile terminal 100 detects, in S321, the second operation action that is performed by the user on the second input apparatus of the mobile terminal 100, the mobile terminal 100 instructs the device 200 to display a first screen. In some embodiments, a trigger message may be used as a notification manner, to trigger the device 200 to display the first screen; or screen unlock password information of the mobile terminal 100 may be sent to the device 200, so that the device 200 displays the first screen.

In some embodiments, if the mobile terminal 100 detects, in S321, the second operation action that is performed by the user on the second input apparatus of the mobile terminal 100, the mobile terminal 100 waits for the user to trigger a verification process on the device 200. To be specific, in S322, after detecting a third operation action that is performed by the user on the device 200, the device 200 sends a request message to the mobile terminal 100, and the mobile terminal 100 performs a transmission process according to the request message, and sends screen unlock password information of the mobile terminal to the device 100.

In a specific embodiment, the second operation action may also be an interactive operation action that is detected by the mobile terminal 100, that is performed by the user, and that meets a preset condition. The second input apparatus is different from the first input apparatus. Using a mobile phone or a tablet computer as an example, the second input apparatus may be a physical button, such as a volume button, a power button, or a screen lock button, or may be a gravity input apparatus or the like, and the second operation action may be preset before factory delivery, or may be set by the user on the "Settings" screen provided in the system of the mobile terminal 100.

Figure 12:
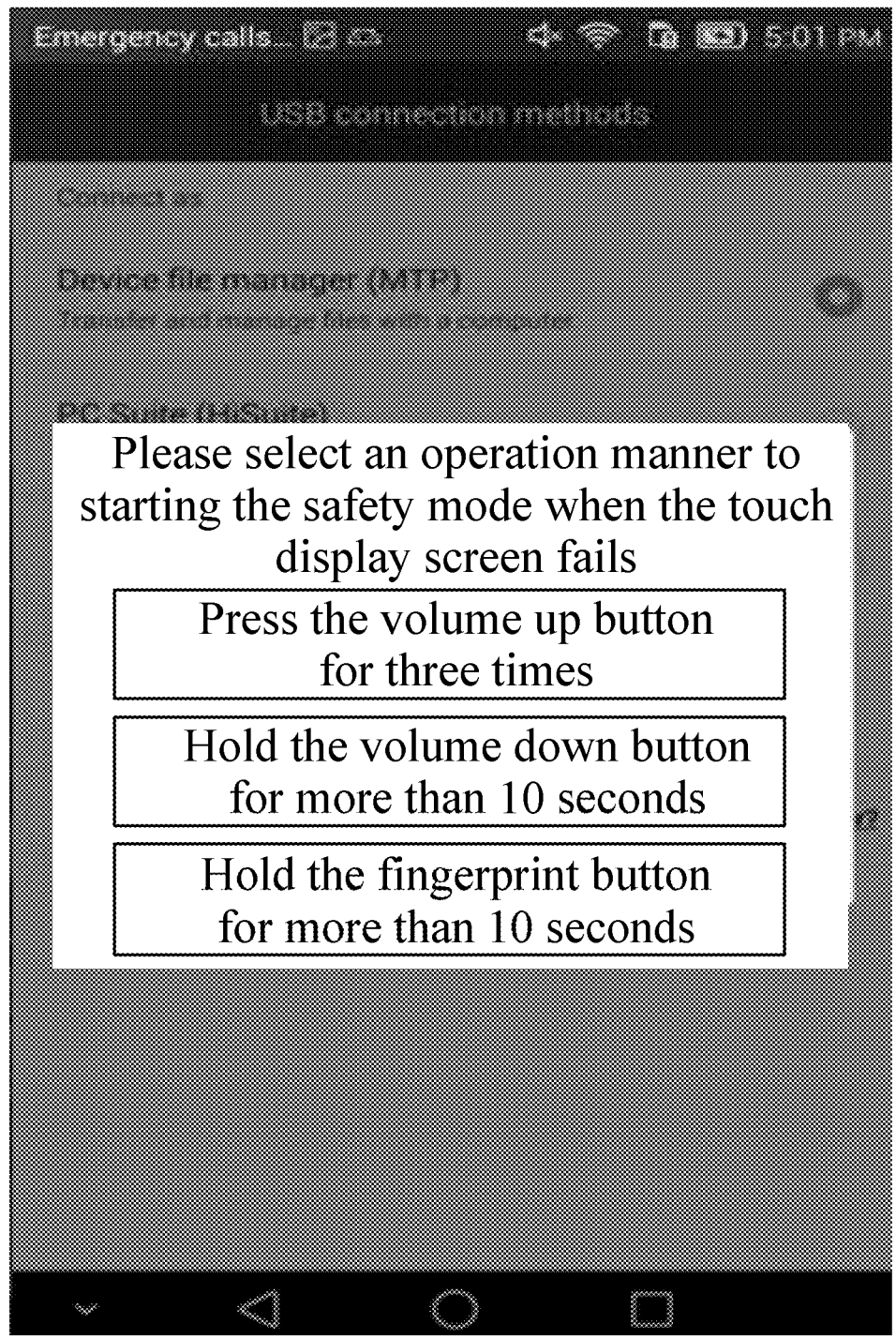
FIG. 12 is a schematic diagram of a screen that is displayed on a mobile terminal and is used to obtain a second operation action detection rule preset by a user according to a specific embodiment of the present invention.

In some embodiments, as shown in FIG. 12, the mobile terminal 100 provides a user with an interaction interface for setting a second operation action detection rule. The mobile terminal 100 prompts that "Please select an operation manner to start a safety mode when the touch display screen fails", and provides several options, for example, continually pressing a volume up button for three times, holding a volume down button for more than 10 seconds, and holding a fingerprint button for more than 10 seconds. In addition, in a setting mode, any operation action or a combination of a plurality of operation actions that is performed by the user in an area other than the touch display screen may be obtained and recorded as the second operation action detection rule.

As shown in FIG. 3, in a specific embodiment, the first input apparatus of the mobile terminal 100 is the touch display screen, and the second input apparatus is the volume up button. When the touch display screen is damaged, the mobile terminal 100 cannot normally interact with the user, and cannot normally detect the first operation action that is performed by the user on the touch display screen. When the mobile terminal 100 detects that the mobile terminal 100 is already connected to the device 200 by using a USB, and detects, by using the second input apparatus, that the user continually presses the volume up button for three times or a time of holding the volume up button is more than 10 seconds, the mobile terminal 100 determines that the second operation action that is entered by the user on the second input apparatus is detected.

Figure 10:
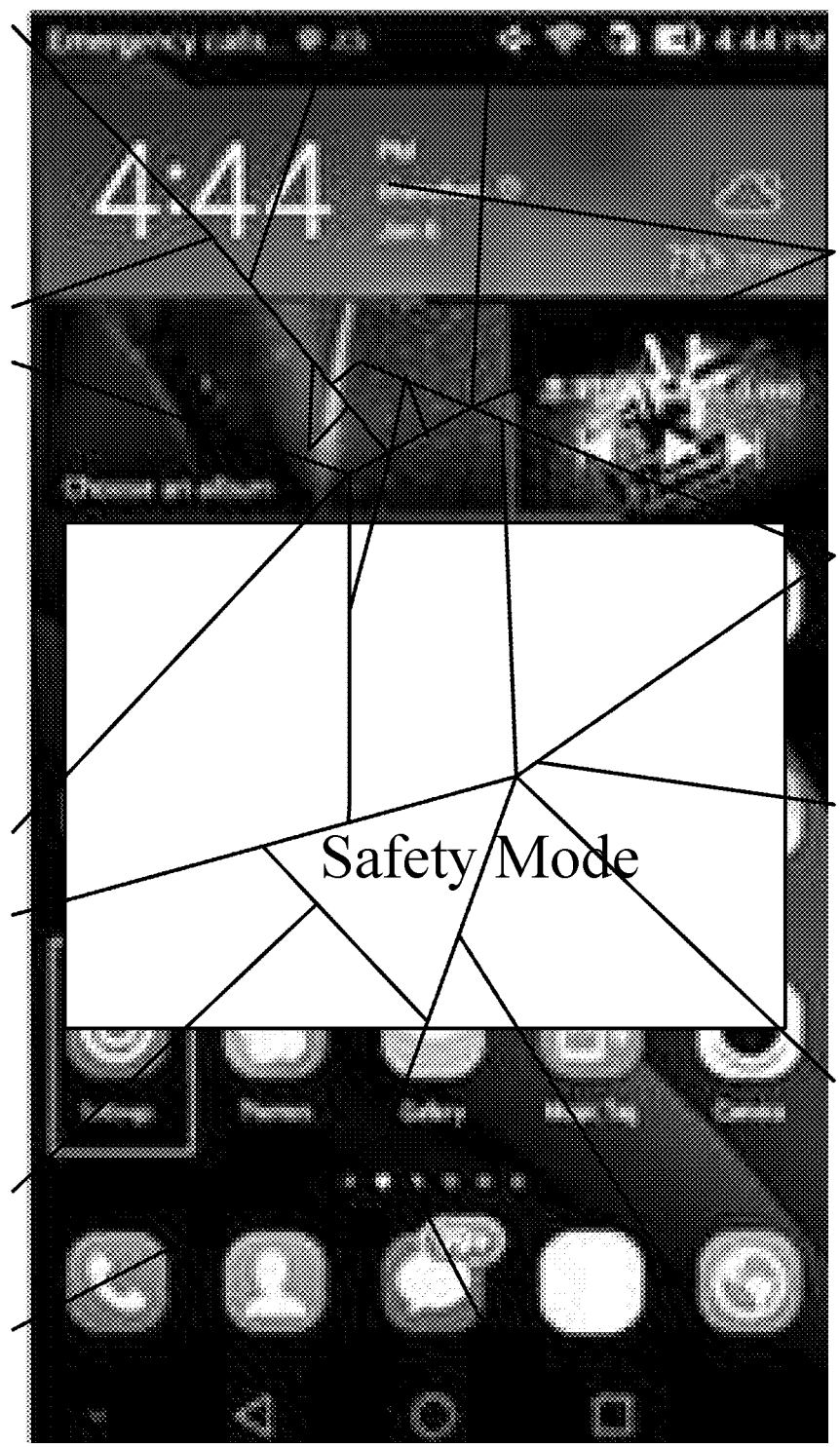
FIG. 10 is a schematic diagram of a prompt screen displayed on a mobile phone after a second operation action is detected according to an embodiment of the present invention.

In some embodiments, after detecting the second operation action, the mobile terminal 100 may switch from the first mode to a third mode. In some embodiments, after detecting the second operation action, the mobile terminal 100 may send a message to the device 200 to notify the device. In a specific embodiment, the mobile phone switches to the "safety mode", and displays, on a display screen, a screen shown in FIG. 10. Certainly, when the display screen of the mobile phone is damaged more seriously, the display screen of the mobile phone even cannot display, or may fail to display the screen "Safety Mode" shown in FIG. 10; in this case, a similar prompt screen is alternatively displayed on the computer, to prompt the user.

The third operation action may also be an interactive operation action that is detected by the device 200, that is entered by the user, and that meets a preset condition. The third operation action may be preset before factory delivery, or may be set by the user on a "Settings" screen provided in the device. For example, if the computer displays an option on a software page that is displayed on a display apparatus of the computer, and detects that the user operates a mouse or a touchscreen to control a cursor to move to the option and clicks the option, the computer detects the third operation action that is performed by the user on the computer.

In some embodiments of the present invention, the device 200 and the mobile terminal 100 perform data communication by using the USB data cable, and determine that the other party has detected a corresponding operation action.

In some embodiments, the device 200 detects the third operation action that is performed by the user on the device 100, and sends a request message to the mobile terminal 100. The request message may include a request for determining whether the mobile terminal 100 detects the second operation action that is performed by the user on the mobile terminal 100, and may further include a request for obtaining whether the mobile terminal 100 is currently in the screen lock state or has a verification password. The mobile terminal 100 may also return a second response message according to the request message, where the second response message may include whether the mobile terminal 100 has currently detected the second operation action (a message indicating whether the mobile terminal 100 is in the third mode may be returned, so that the device 200 indirectly determines whether the mobile terminal 100 has detected the second operation action). After the mobile terminal 100 detects the second operation action, the second response message may further include the screen unlock password information. If the mobile terminal 100 is in the screen lock state or has a verification password, the screen unlock password information of the mobile terminal 100 is sent to the device 200 when the device 200 needs to be verified, or if the mobile terminal 100 is not in the screen lock state or has no verification password, the mobile terminal 100 may send a response message to the device 200 to notify the device 200. Optionally, the device 200 may display prompt information on a displayed screen, to prompt user to performed the second operation action on the second input apparatus of the mobile terminal 100, so as to prevent the mobile terminal 100 from failing to normally display prompt information because the display apparatus is faulty.

Figure 11A:
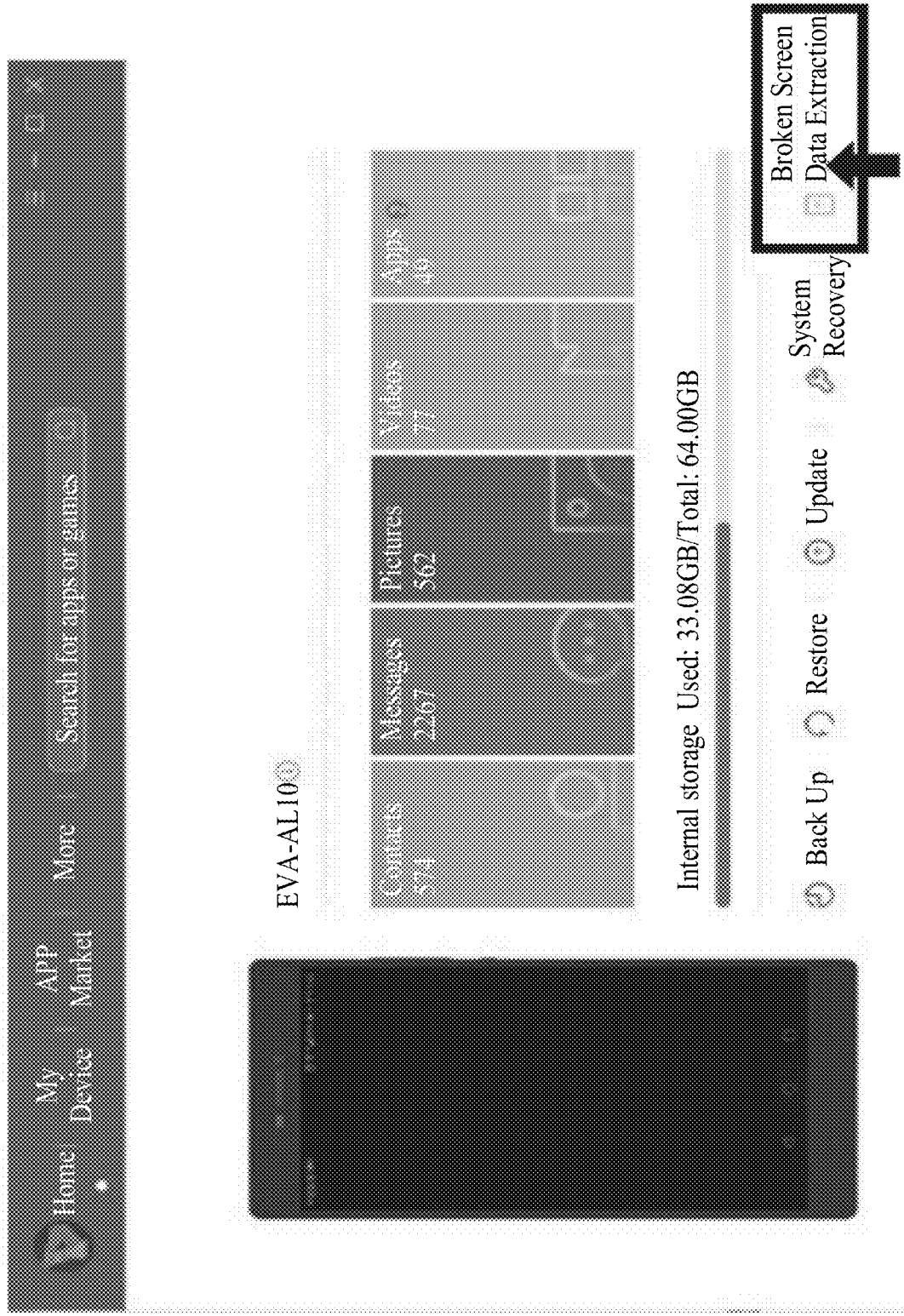
FIG. 11a to FIG. 11e are schematic diagrams of prompt screens displayed on a computer when a mobile phone is connected to the computer by using a data cable according to an embodiment of the present invention.

In a specific embodiment, as shown in FIG. 11*a*, after detecting that the user clicks "Broken Screen Data Extraction" on a computer screen by operating a computer mouse, the computer sends a message to the mobile terminal 100 by using the USB data cable. If the mobile phone has detected the second operation action, the mobile phone sends information of a screen unlock password of the mobile phone to the computer, and the computer displays a prompt message on a displayed screen, such as a prompt message shown in FIG. 11*b*, to prompt the user to enter the screen unlock password of the mobile phone on a computer side. Optionally, if the mobile phone has not detected the second operation action performed by the user, "Please continually press the volume up button on the mobile phone for three times, to start a mobile phone safety mode" is displayed on the displayed screen of the computer, as shown in FIG. 11*c*.

Then, in S323, the device 200 generates and displays the first screen, where the first screen is used to prompt the user to enter the screen unlock password of the mobile terminal on the device 200.

In this embodiment of the present invention, the screen unlock password of the mobile terminal is a password of the mobile terminal for removing screen lock, and the screen unlock password of the mobile terminal may be preset by the user based on a graphical interaction interface on the mobile terminal, or may be a registered account password corresponding to the mobile terminal, a factory-set password of the mobile terminal, or the like.

Figure 11B:
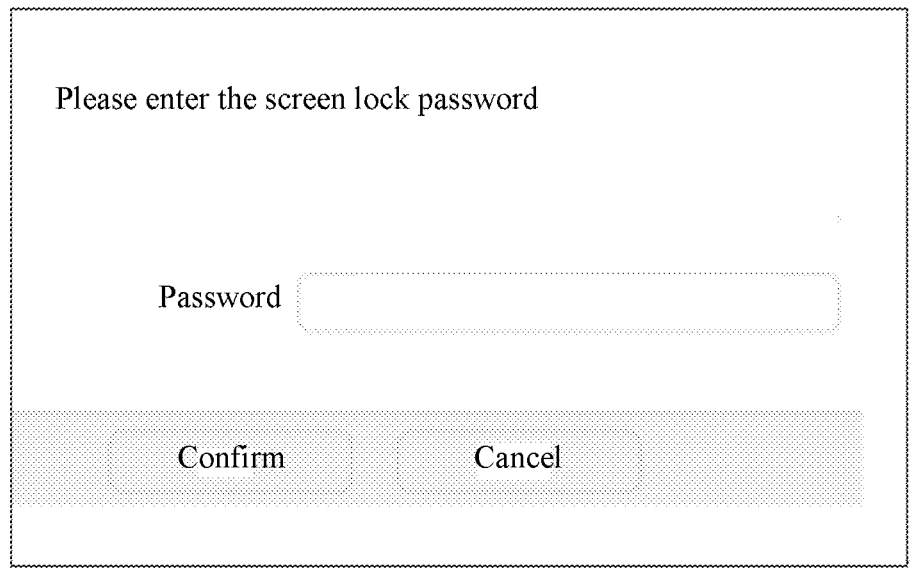
Figure 11C:
Figure 11C:
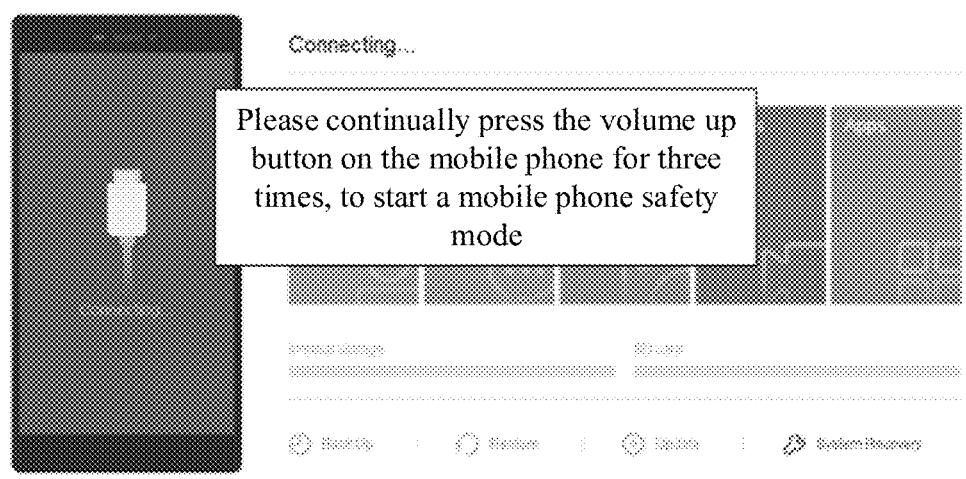

The screen unlock password herein may be digits, letters, characters, or a character string combined by any one or more types, and therefore a prompt screen displayed on the device 200 may be shown in FIG. 11*b*. The screen unlock password may alternatively be a pattern password (such as a nine-box grid), and therefore a prompt screen displayed on the device 200 may be shown in FIG. 11*d*.

In some embodiments, there may be one or more types of screen unlock passwords. The screen unlock passwords may include a first password that needs to be entered by using the touch display screen on the mobile terminal 100, such as a character string password and a pattern password, and may further include a second password that does not need to be entered by using the touch display screen of the mobile terminal on the mobile terminal 100, such as a fingerprint password, a voiceprint password, an iris password, and even another biometric password that can be uniquely corresponding to the user. The foregoing types of passwords may not be input by using the touch display screen. For example, the fingerprint password is collected by using a fingerprint input apparatus, the voiceprint password is collected by using a microphone, and the iris password is collected by using a camera. Therefore, the types of passwords may also be input by the user on the mobile terminal 100 or the device 200 (such as a computer, namely, a PC), to perform access verification.

In a specific embodiment similar to that shown in FIG. 4, in a password input phase, the user is allowed to input, on the mobile terminal 100, the second password that does not need to be entered by using the touch display screen, and the mobile terminal 100 obtains the second password that is input by the user on an input apparatus different from the touch display screen of the mobile terminal 100.

In some embodiments, the screen unlock password may be further a fingerprint password, a voiceprint password, an iris password, and even another biometric password that can be uniquely corresponding to the user.

Figure 11D:
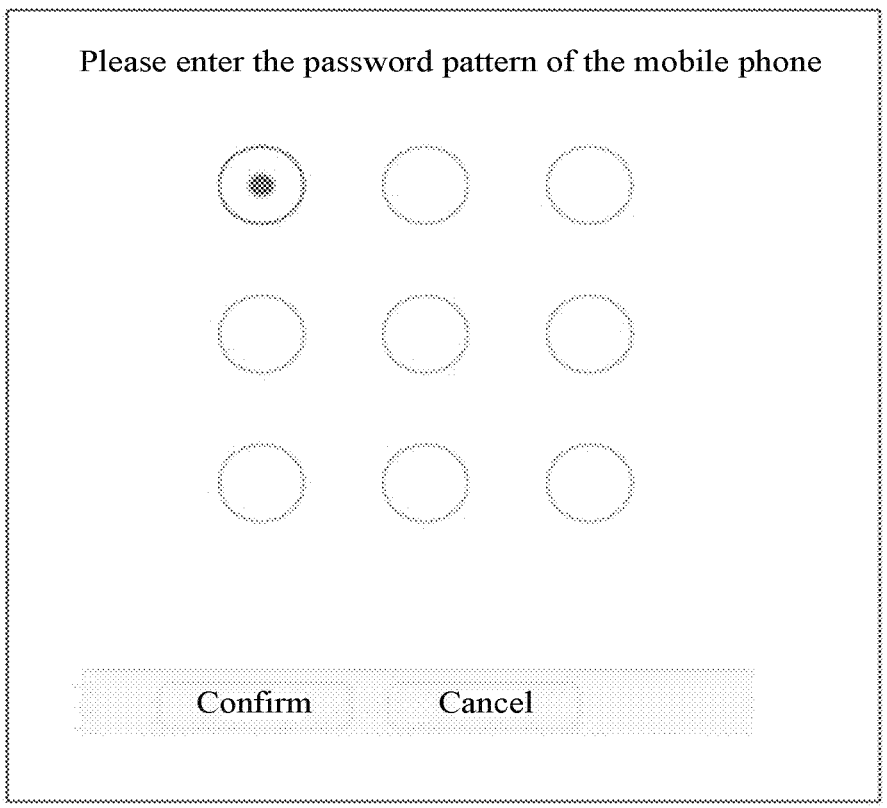
Figure 11E:
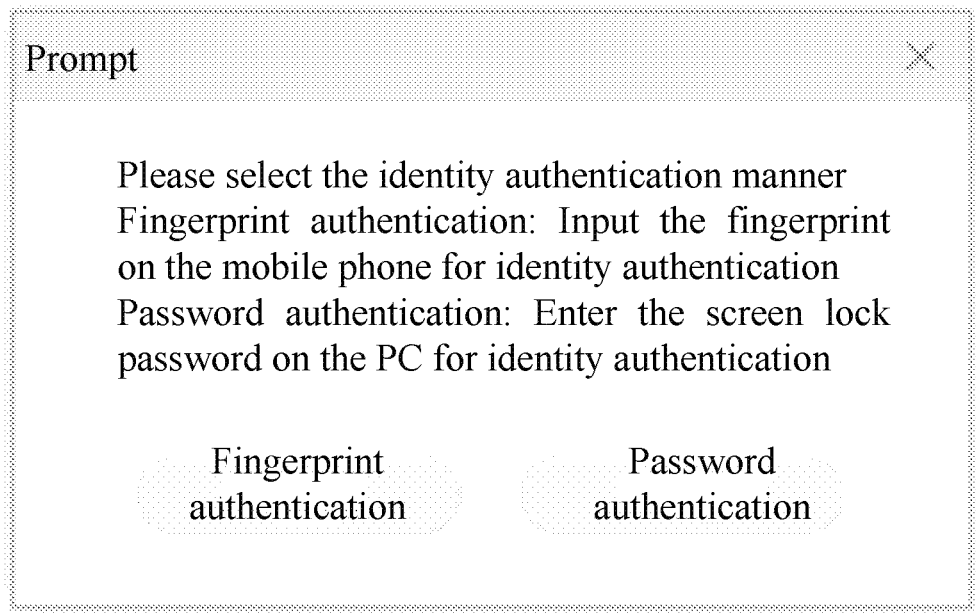

In a specific embodiment, the screen unlock password information of the mobile terminal 100 that is sent by the mobile terminal 100 to the device 200 prompts that the screen unlock password includes a fingerprint password and a character string password, and the device 200 displays a screen shown in FIG. 11*e* on the computer based on the information, so that the user selects to input a fingerprint on the mobile phone or enter a screen unlock password of a character string on the PC for verification.

In addition, in some embodiments, the mobile terminal 100 may determine, based on whether the mobile terminal 100 is in the screen lock state and whether the mobile terminal 100 has a screen unlock password, whether the screen unlock password information needs to be sent. For example, if the mobile terminal 100 is in an unlock state or no screen unlock password has been set on the mobile terminal 100, according to a preset verification rule, for example, the mobile terminal 100 was ever connected to the device 200, the mobile terminal 100 may not send the screen unlock password information, but may send a response message, and directly allow access of the device 200. If the mobile terminal 100 is in the screen lock state and the mobile terminal 100 has the screen unlock password, the mobile terminal 100 sends the screen unlock password information.

To improve security of access verification, in some embodiments, the mobile terminal 100 may also send the screen unlock password when the mobile terminal 100 is in the unlock state, to prompt the user to enter a corresponding password on the device 200 for verification. In some other embodiments, when the mobile terminal 100 does not have the screen unlock password, the mobile terminal 100 may also send a factory-set password of the device or a registered account password of the device, to prompt the user to enter a corresponding password on the device 200 for verification.

Then, in S234, the screen unlock password entered by the user is verified, and a verification process may be performed by the device 200 or the mobile terminal 100.

In some embodiments, when sending the screen unlock password information to the device 200, the mobile terminal 100 may send a verification rule to the device 200 at the same time. After obtaining the screen unlock password that is entered by the user on the device, the device 200 directly verifies whether the entered password is correct, and sends a verification result to the mobile terminal 100 after verification is successful.

In some other embodiments, after obtaining the screen unlock password that is entered by the user on the device, the device 200 may send, to the mobile terminal 100, the obtained screen unlock password that is entered by the user on the device, and the mobile terminal 100 invokes an inner verification module to verify the screen unlock password that is entered by the user on the device. The mobile terminal 100 may alternatively directly verify the screen unlock password that is obtained by the mobile terminal 100 and that is entered by the user on an input apparatus different from the touch display screen of the mobile terminal, and sends a verification result to the device 200 after verification is successful. Security is higher if the mobile terminal 100 performs verification.

In some embodiments, when the first input apparatus of the mobile terminal 100 is damaged, and the mobile terminal 100 cannot normally detect the first operation action performed by the user, after the second input apparatus detects the second operation action performed by the user, the mobile terminal 100 cannot complete access verification by using only the mobile terminal 100. Therefore, the mobile terminal 100 and the device 200 transfer a message to each other. After learning that the device 200 detects the third operation action that is performed by the user on the device, the mobile terminal 100 sends password information of the mobile terminal to the mobile terminal, so as to display the first screen on the display apparatus of the device 200, and obtains the screen unlock password corresponding to the mobile terminal that is entered by the user on the device 200, and then the device 200 or the mobile terminal 100 performs verification. Therefore, when the first input apparatus is possibly damaged, secure access verification can still be implemented.

In S235, after verification is successful, the mobile terminal 100 is allowed to access the device 200.

Figure 13:
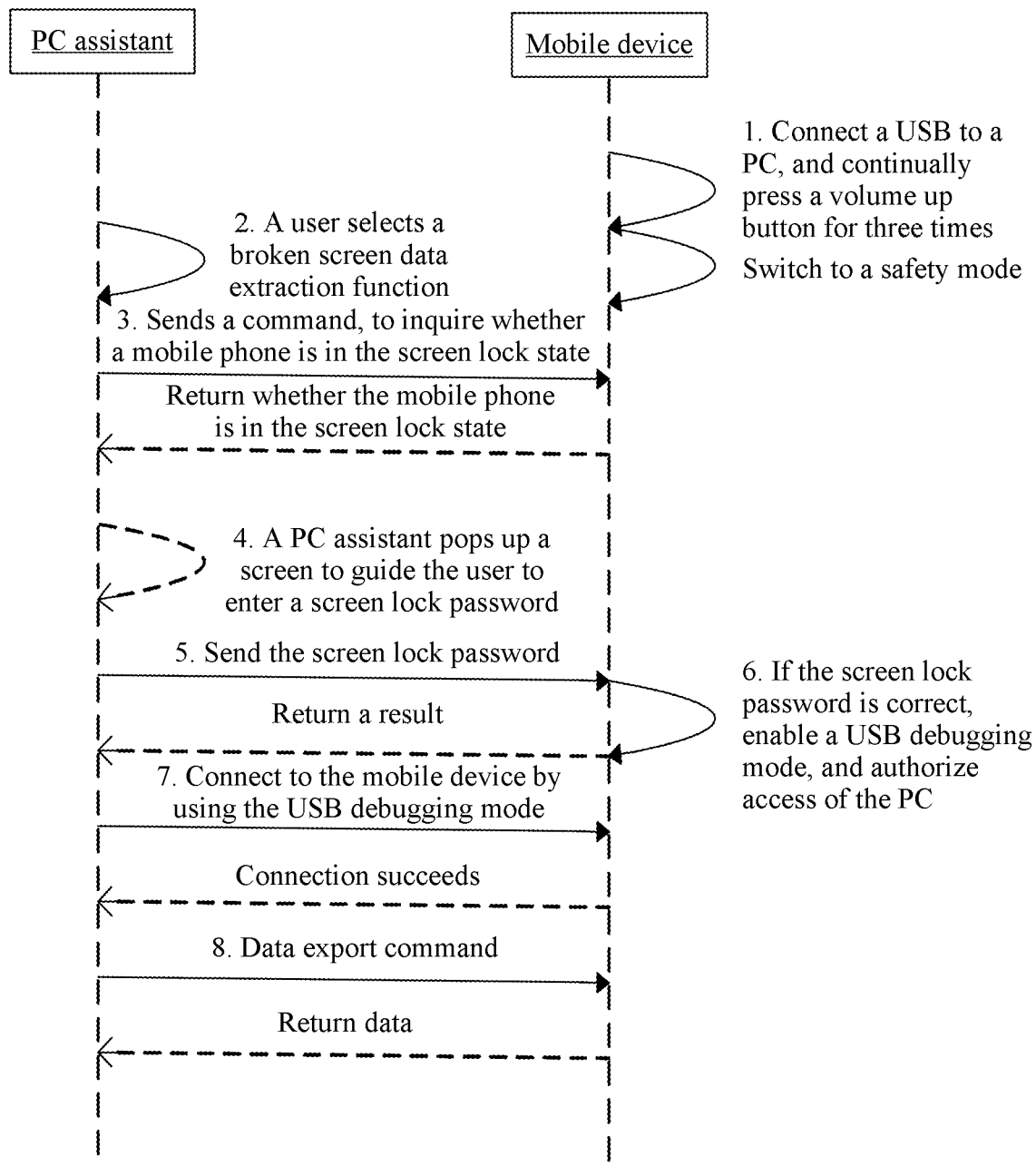
FIG. 13 is a schematic flowchart of an access verification method implemented after a mobile device is connected to a computer by using a USB data cable according to a specific embodiment of the present invention.

FIG. 13 is a schematic flowchart of an access verification method implemented after a mobile device is connected to a computer by using a USB data cable according to a specific embodiment of the present invention.

It is assumed that the mobile device is a mobile phone. In a conventional access verification manner, to ensure security of connection between a mobile phone and a computer, after the mobile phone is connected to the computer by using a USB data cable, the computer and the mobile phone need to complete access verification. In an access verification process, only after a series of operations are performed on a touch display screen of the mobile terminal, the computer is allowed to access data, and the computer is allowed to export data in the mobile phone from the mobile phone. When the touch display screen of the mobile terminal is damaged, and a touch operation cannot be normally detected, the foregoing access verification method cannot be used to implement access of the computer to the mobile phone.

The method in this embodiment is applicable to implementation of access verification of the mobile phone and the computer when the touch display screen of the mobile phone is damaged, so that the computer is allowed to access the mobile phone and export data from the mobile phone.

In this embodiment, the computer has a mobile phone assistant application. The mobile phone assistant application is a computer program that can run on the computer. The computer may run the mobile phone assistant application, to implement communication and data transmission between the computer and the mobile phone.

Figure 9:
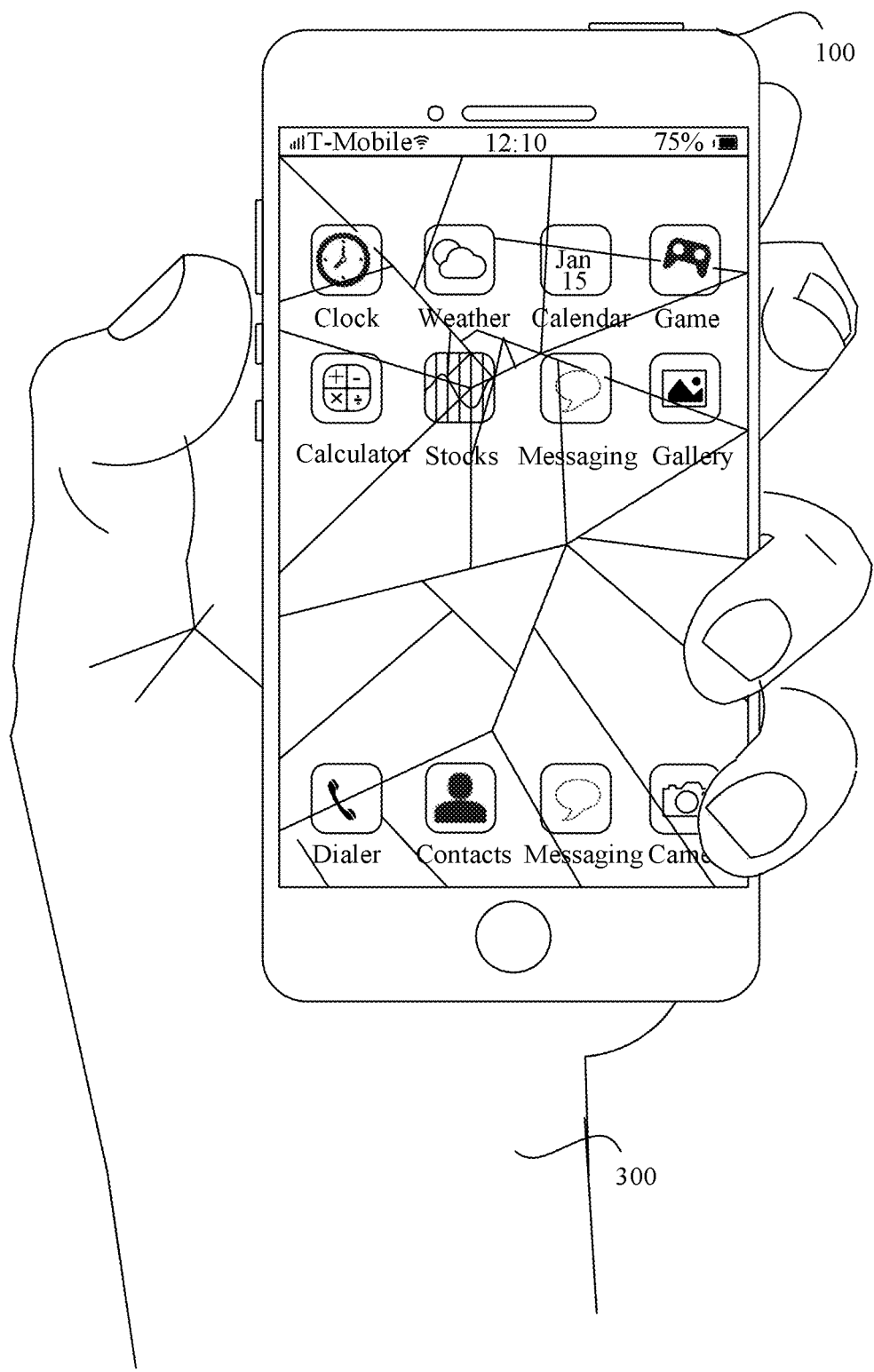
FIG. 9 is a schematic diagram of detecting, by a mobile phone, an operation action of a user according to some embodiments of the present invention.

In step 1, the mobile phone detects that the mobile phone is connected to the computer (Computer) by using a USB data cable. Referring to FIG. 9, if the mobile phone detects that a hand of a user continually presses a volume up button for three times, the mobile phone proactively switches to a safety mode. In the safety mode, the computer may send a command by using the mobile phone assistant application of the computer, to communicate with the mobile phone.

In some embodiments, the mobile phone may recognize, by using bottom-layer drive software, an operation action performed on the mobile phone by the user, and switch to the safety mode after detecting a corresponding operation action.

In step 2, the computer detects that the user clicks a "Broken Screen Data Extraction" button on a screen of the mobile phone assistant application, and the mobile phone assistant application enters a broken screen extraction function screen. Refer to FIG. 11a.

Then, in step 3, the computer sends a request command to the mobile phone by using the USB data cable, to inquire whether the mobile phone is in the screen lock state. Then, the mobile phone returns a response message indicating whether the mobile phone is currently in the screen lock state. If the mobile phone is in the screen lock state, the response message further includes unlock password related information such as whether an unlock password is digits, a character string, or a pattern, a length of the unlock password, and a pattern style. If the mobile phone is not in the screen lock state, step 4, step 5, and step 6 are omitted, and the mobile phone directly authorizes access of the computer, and step 7 is performed. If the mobile phone is in the screen lock state, the following steps are performed.

In step 4, if the response message returned in step 3 indicates that the mobile phone is in the screen lock state, the mobile phone assistant application generates a prompt screen based on the unlock password related information, to prompt the user to enter a screen unlock password of the mobile phone on the prompt screen. Refer to FIG. 11b to FIG. 11d.

In step 5, the obtained screen unlock password that is entered by the user on the prompt screen of the mobile phone assistant application is sent to the mobile phone by using a safety mode command.

In step 6, the mobile phone performs password authentication on the received screen unlock password, and if the screen unlock password is correct, access verification is successful. It is assumed that the mobile phone uses an Android system (Android). The mobile phone enables a USB debugging mode, and authorizes the computer to connect to the mobile phone. If the screen unlock password is incorrect, the mobile phone rejects access, and returns a result to the computer. For a computer screen, refer to FIG. 8*i*.

In some embodiments, the mobile phone may invoke a screen lock module to perform password authentication on the received screen unlock password.

In step 7, the computer is connected to the mobile phone by using the USB debugging mode of the mobile phone.

In step 8, after successful connection, the mobile phone assistant application sends a data export command to the mobile phone, and the mobile phone returns data, to complete a data export process. In addition, the computer may further recognize personal data of the mobile phone by using the mobile phone assistant, and back up the personal data to the computer based on an operation action of the user. The personal data may include but is not limited to applications, application data, pictures, videos, contacts, SMS messages, call records, music, other personal files, and the like.

In this embodiment, the mobile phone sends, according to a request of the computer, the unlock password related information to the computer when the mobile phone is currently in the screen lock state; and the computer displays a password prompt screen, and obtains a mobile phone related unlock password that is entered by the user on the computer. The computer obtains the unlock password of the mobile phone, and the user does not need to perform a corresponding operation on the touch display screen of the mobile terminal. Therefore, when the touch display screen of the mobile terminal is damaged, and a touch operation cannot be normally detected, the computer can still access the mobile phone on the premise of ensuring security of the mobile phone. In addition, when the mobile phone is in a USB connection to the computer, the mobile phone switches to the safety mode by detecting an operation action that is performed by the user on a non-touch display screen of the mobile phone, so that security of the mobile phone is further improved.

An aspect of the present invention provides a device. The device includes a first processor, a first memory, a device input apparatus, and a first display. For a structural relationship between apparatuses of the device, briefly refer to FIG. 6. The device includes a first processor, a first memory, a device input apparatus, and a first display. The first memory is configured to store an instruction. The first processor is configured to perform the following steps according to the instruction: when the device detects that the device is already connected to a mobile terminal by using a data cable, after the mobile terminal detects a first operation action that is performed by a user on a first input apparatus of the mobile terminal gaining, for the device, access to the mobile terminal; and when it is determined that the mobile terminal detects a second operation action that is performed by the user on a second input apparatus of the mobile terminal, displaying a first screen by using the first display, where the first screen is used to prompt the user to enter a screen unlock password of the mobile terminal on the device, obtaining, by using the device input apparatus, and verifying the screen unlock password of the mobile terminal that is entered by the user on the device, or sending, to the mobile terminal for verification, the obtained screen unlock password of the mobile terminal that is entered by the user on the device, and allowing access to the mobile terminal after it is determined that verification is successful. For details about a process in which the device implements access verification when the device is connected to the mobile terminal by using the data cable, refer to some embodiments of the foregoing method, and details are not described again.

Other aspects of the present invention provide a mobile terminal for implementing access verification on a device by the mobile terminal. The mobile terminal includes a first input apparatus, a second input apparatus, a second processor, and a second memory. Also briefly refer to FIG. 6 for a structural relationship between apparatuses of the mobile terminal (where the first input apparatus and the second input apparatus each are an input apparatus). The second memory is configured to store an instruction. The second processor is configured to perform the following steps according to the instruction: detecting that the mobile terminal is connected to the device by using a data cable; and allowing access of the device when a first operation action that is performed by a user on the first input apparatus is detected; or when a second operation action that is performed by the user on the second input apparatus is detected, sending screen unlock password information of the mobile terminal to the device, to display, on the device, a first screen that is used to prompt the user to enter a screen unlock password of the mobile terminal on the device, obtaining and verifying the screen unlock password of the mobile terminal that is entered by the user on the device, or obtaining a verification result of the device for the screen unlock password of the mobile terminal that is entered by the user on the device, and allowing access of the device after it is determined that verification is successful. For details about a process in which the mobile terminal implements access verification when the mobile terminal is connected to the device by using the data cable, refer to some embodiments of the foregoing method, and details are not described again.

Another aspect of the present invention provides a device for implementing access verification on the device by a mobile terminal. The device includes a first connection detection module, a first access verification module, and a second access verification module. The first connection detection module is configured to detect that the device is already connected to the mobile terminal by using a data cable. The second connection detection module is configured to allow access to the mobile terminal after the mobile terminal detects a first operation action that is performed by a user on a first input apparatus of the mobile terminal. The second access verification module is configured to: when the device detects that the device is connected to the mobile terminal by using the data cable, display a first screen when it is determined that the mobile terminal detects a second operation action that is performed by the user on a second input apparatus of the mobile terminal. The first screen is used to prompt the user to enter a screen unlock password of the mobile terminal on the device; obtain and verify the screen unlock password of the mobile terminal that is entered by the user on the device, or send, to the mobile terminal for verification, the obtained screen unlock password of the mobile terminal that is entered by the user on the device; and allow access to the mobile terminal after it is determined that verification is successful.

In some embodiments, the second access verification module is configured to display the first screen after a third operation action that is performed by the user on the device is detected.

In some embodiments, the second access verification module includes: an information obtaining unit, configured to obtain screen unlock password information of the mobile terminal from the mobile terminal; a generation unit, configured to generate the first screen based on the screen unlock password information of the mobile terminal; and a display unit, configured to display the first screen on a display apparatus.

In some embodiments, the second access verification module includes: a sending unit, configured to send, to the mobile terminal for verification, the screen unlock password of the mobile terminal that is entered by the user on the device; and a result obtaining unit, configured to obtain a verification result from the mobile terminal.

For details about a process in which the foregoing device and the modules of the device implement access verification when the device is connected to the mobile terminal by using the data cable, refer to steps corresponding to some embodiments of the foregoing method, and details are not described again.

Some other embodiments of the present invention provide a mobile terminal for implementing access verification on a device by the mobile terminal. The mobile terminal includes a second connection detection module, a third access verification module, and a fourth access verification module. The second connection detection module is configured to detect that the mobile terminal is connected to the device by using a data cable. The third access verification module is configured to allow access of the device when a first operation action that is performed by a user on a first input apparatus of the mobile terminal is detected. The fourth access verification module is configured to: when a second operation action that is performed by the user on a second input apparatus of the mobile terminal is detected, send screen unlock password information of the mobile terminal to the device, to display, on the device, a first screen that is used to prompt the user to enter a screen unlock password of the mobile terminal on the device, obtain and verify the screen unlock password of the mobile terminal that is entered by the user on the device, or obtain a verification result of the device for the screen unlock password of the mobile terminal that is entered by the user on the device, and allow access of the device after it is determined that verification is successful.

In some embodiments, the third access verification module includes a first switching unit, configured to switch from a first mode to a second mode in response to the detected first operation action that is performed by the user on the first input apparatus of the mobile terminal, so as to allow access of the device.

In some embodiments, the fourth access verification module includes: a message receiving unit, configured to receive a request message that is sent by the device based on a detected third operation action that is performed by the user on the device; and an information sending unit, configured to send the screen unlock password information of the mobile terminal to the device according to the request message.

In some embodiments, the fourth access verification module further includes a second switching unit, configured to switch from the first mode to a third mode in response to the detected second operation action that is performed by the user on the second input apparatus of the mobile terminal, where the information sending unit receives, in the third mode, the request message that is sent by the device based on the detected third operation action that is performed by the user on the device, and sends the screen unlock password information of the mobile terminal to the device according to the request message.

In some embodiments, the fourth access verification module is further configured to switch from the third mode to the second mode after verification is successful, so as to allow access of the device.

For details about a process in which the foregoing mobile terminal and the modules of the mobile terminal implement access verification when the mobile terminal is connected to the device by using the data cable, refer to steps corresponding to some embodiments of the foregoing method, and details are not described again.

Figure 14:
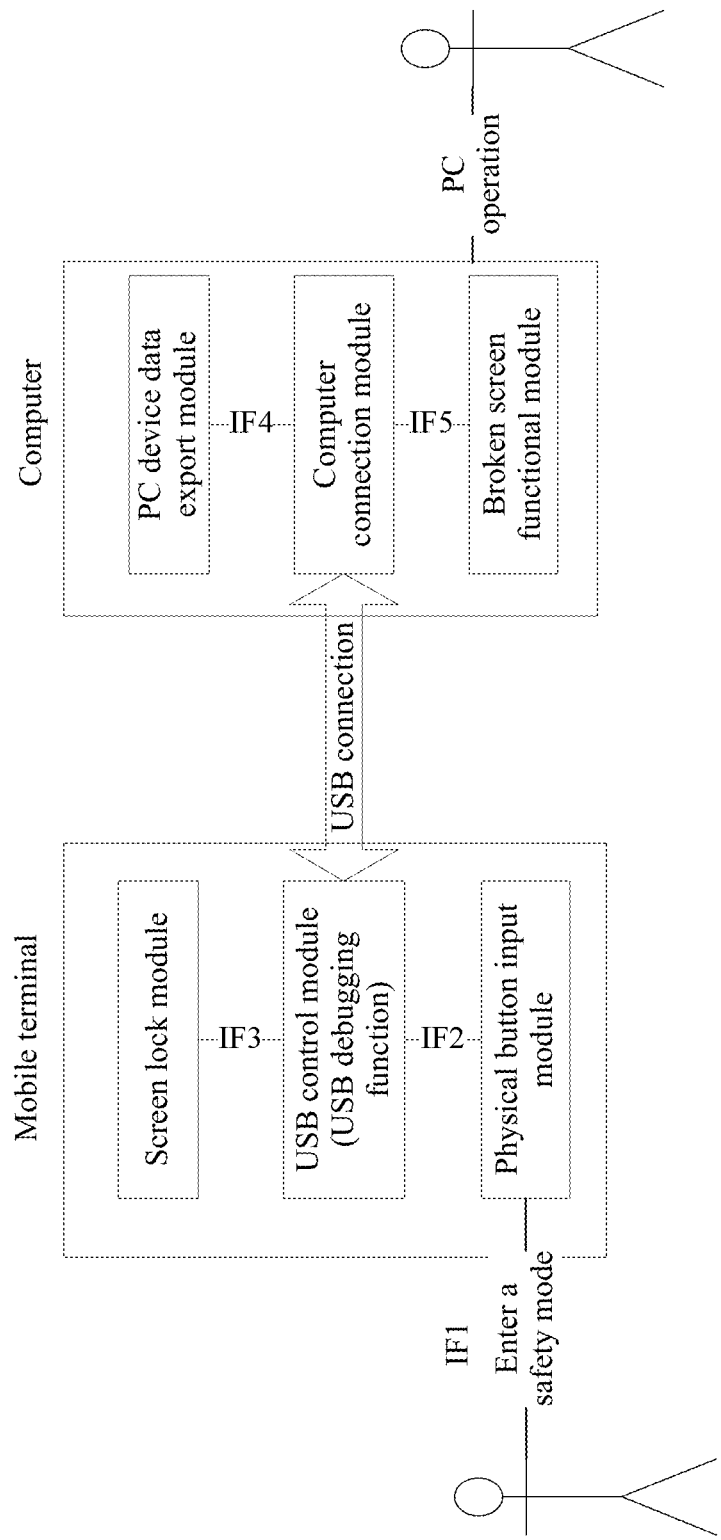
FIG. 14 is a schematic diagram of modules for implementing access verification when a mobile terminal is connected to a computer by using a USB data cable according to a specific embodiment of the present invention.

FIG. 14 is a schematic structural diagram of a mobile phone and a computer according to an embodiment of the present invention. The mobile phone includes a screen lock module, a USB control module, and a physical button input module. The computer includes a data export module, a connection module, and a broken screen functional module. The physical button input module is configured to detect an operation action that is performed by a user on a physical button and that requests to enter a safety mode, and send a signal to the USB control module. The USB control module is configured to trigger, based on the signal sent by the physical button input module, to enable the safety mode. The screen lock module is configured to verify a screen unlock password, to perform access verification, and after verification is successful, authorize the computer to perform connection and data management. The broken screen functional module is configured to obtain a broken screen extraction request operation performed by the user on the computer, and trigger the computer connection module to start an access verification function before a connection. The computer connection module is configured to provide a function of connecting to a mobile device, and connect to the mobile device by using a connection function provided by the mobile device, such as an ADB function in a USB debugging mode of an Android system. After a PC assistant is connected to the mobile phone by using the ADB, the PC assistant may import or export data, back up data, manage files of the mobile phone such as pictures and videos, and provide functions of application installation and uninstallation, application backup, system upgrade, and the like. The broken screen functional module is configured to: when the mobile phone is in the screen lock state, provide a user operation interface, prompt the user to enter a screen unlock password, send the screen unlock password to the mobile phone, and connect to the mobile phone after obtaining authorization of the mobile phone.

Further, in FIG. 14, IF1 represents that the user performs an operation action on a physical button; IF2 represents converting a physical signal input by the user into an execution action of controlling a USB connection mode; IF3 represents that the screen lock functional module manages and controls the USB debugging mode when the mobile phone is in the screen lock state; IF4 represents connecting to the mobile device by using the USB debugging mode, and exporting personal data of the mobile device; and IF5 represents converting an operation instruction input by the user into an execution function.

Specifically, in a process of access verification, the physical button input module detects the operation action performed by the user on the physical button, and sends a signal to the USB control module, to trigger the USB control module to switch a mode of the mobile terminal; the broken screen functional module provides the user operation interface, prompts the user to enter the screen unlock password, and sends the screen unlock password to the USB control module of the mobile terminal by using the connection module; the USB control module sends the screen unlock password entered by the user to the screen lock module for verification, and after verification is successful, allows the device to perform connection and input management; the USB control module is connected to the connection module of the device by using a USB data cable after verification of the screen lock module is successful, the device implements, by using the connection module, a function of connecting to the mobile terminal; and then the data export module exports data of the mobile device by using the connection module.

In addition, an embodiment of this application provides two computer program products including an instruction, where one computer program product is installed in the device, and the other computer product is installed in the mobile terminal. Refer to description of FIG. 7 for an implementation method of the computer program products.

In conclusion, the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A verification method, comprising:
    detecting, by a device and a mobile terminal, that an end of the device is connected to an end of the mobile terminal using a data cable;
    gaining, by the device, access to data of the mobile terminal using the data cable in response to the mobile terminal detecting a first operation action on the mobile terminal, wherein the first operation action is performed by a user on a touch display screen of the mobile terminal;
    displaying, by the device, a first screen after determining that the first operation action has not been detected on the mobile terminal and in response to the mobile terminal detecting a second operation action on the mobile terminal and the device detecting a third operation action being performed by the user on the device, wherein the second operation action is performed by the user on a physical button of the mobile terminal, and wherein the first screen is displayed to prompt the user to enter a screen unlock password of the mobile terminal on the device;
    receiving, by the device, information associated with the screen unlock password from the mobile terminal when the mobile terminal is in a screen lock state and in response to the third operation action being performed;
    verifying, by the device or the mobile terminal, the screen unlock password of the mobile terminal that is entered by the user on the device; and
    gaining, by the device, access to the data of the mobile terminal in response to the verifying.

2. The verification method according to claim 1, further comprising:
    obtaining, by the device, screen password information of the mobile terminal from the mobile terminal;
    generating, by the device, the first screen based on screen unlock password information of the mobile terminal; and
    displaying the first screen.

3. The verification method according to claim 1, wherein the screen unlock password comprises at least one of a character string password, a pattern password, a fingerprint password, a voice password, or an iris password.

4. The verification method according to claim 1, wherein the first operation action is an interactive operation action meeting a present condition.

5. A verification method implemented by a device, comprising:
    detecting that the device is connected to a mobile terminal using a data cable;
    gaining access to data of the mobile terminal using the data cable after a first operation action is performed by a user on the mobile terminal, wherein the first operation action is performed by the user on a touch display screen of the mobile terminal;
    displaying a first screen after determining that the first operation action has not been performed by the user on the mobile device and a second operation action has been performed by the user on the mobile terminal and in response to a third operation action being performed by the user on the device, wherein the second operation action is performed by the user on a physical button of the mobile terminal, and wherein the first screen is displayed to prompt the user to enter a screen unlock password of the mobile terminal on the device;
    receiving information associated with the screen unlock password from the mobile terminal when the mobile terminal is in a screen lock state and in response to the third operation action being performed;
    verifying the screen unlock password of the mobile terminal that is entered by the user on the device; and
    gaining access to the data of the mobile terminal in response to successfully verifying the screen unlock password.

6. The verification method according to claim 5, further comprising:
    obtaining screen unlock password information of the mobile terminal from the mobile terminal;
    generating the first screen based on the screen unlock password information of the mobile terminal; and
    displaying the first screen.

7. The verification method according to claim 5, wherein verifying the screen unlock password of the mobile terminal that is entered by the user on the device comprises sending the screen unlock password to the mobile terminal for verification.

8. The verification method according to claim 5, wherein the first operation action comprises a series of interactive operation actions meeting a preset condition.

9. A verification method implemented by a mobile terminal, comprising:
    detecting that the mobile terminal is connected to a device using a data cable;
    allowing the device to access data of the mobile terminal using the data cable in response to a first operation action being performed by a user on the mobile terminal, wherein the first operation action is performed by the user on a touch display screen of the mobile terminal;
    instructing the device to display a first screen after determining that the first operation action has not been performed by the user on the mobile terminal and in response to a second operation action being performed by the user on the mobile terminal and a third operation action being performed by the user on the device, wherein the second operation action is performed by the user on a physical button of the mobile terminal, and wherein the first screen is displayed to prompt the user to enter a screen unlock password of the mobile terminal on the device;

sending information associated with the screen unlock password to the device when the mobile terminal is in a screen lock state and in response to the third operation action being performed;

verifying the screen unlock password of the mobile terminal that is entered by the user on the device; and allowing the device to access the data of the mobile terminal in response to successfully verifying the screen unlock password.

10. The verification method according to claim 9, wherein in response to the first operation action being performed on the touch display screen of the mobile terminal, the verification method further comprises:

switching from a first mode to a second mode; and allowing the device to access the data of the mobile terminal.

11. The verification method according to claim 9, further comprising:

receiving a request message from the device in response to the third operation action being performed by the user on the device; and sending information associated with the screen unlock password to the device according to the request message.

12. The verification method according to claim 11, further comprising:

switching from a first mode to a third mode in response to the second operation action being performed by the user on the physical button of the mobile terminal; and receiving, in the third mode, the request message from the device in response to the third operation action being performed by the user on the device.

13. The verification method according to claim 12, wherein in response to successfully verifying the screen unlock password, the verification method further comprises:

switching from the third mode to a second mode; and allowing the device to access the data of the mobile terminal.

14. The verification method according to claim 9, wherein verifying the screen unlock password of the mobile terminal that is entered by the user on the device comprises obtaining a verification result of the device for the screen unlock password of the mobile terminal that is entered by the user on the device.

15. The verification method according to claim 9, wherein the verification method further comprises detecting the first operation action based on a change of voltage or capacitance of the touch display screen.

16. The verification method according to claim 9, wherein the verification method further comprises detecting the second operation action based on a receiving a selection of the physical button.

* * * * *